United States Patent
Yost

(10) Patent No.: US 9,331,534 B2
(45) Date of Patent: *May 3, 2016

(54) MODULAR MICRO WIND TURBINE

(71) Applicant: American Wind, Inc., Harvest, AL (US)

(72) Inventor: Robert D. Yost, Harvest, AL (US)

(73) Assignee: American Wind, Inc., Harvest, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/700,020

(22) Filed: Apr. 29, 2015

(65) Prior Publication Data

US 2015/0244220 A1    Aug. 27, 2015

Related U.S. Application Data

(63) Continuation-in-part of application No. 13/430,243, filed on Mar. 26, 2012, now Pat. No. 9,062,654.

(51) Int. Cl.
| | |
|---|---|
| *F03D 9/00* | (2006.01) |
| *H02K 1/27* | (2006.01) |
| *H02K 1/30* | (2006.01) |
| *F03D 1/04* | (2006.01) |

(52) U.S. Cl.
CPC .............. *H02K 1/2793* (2013.01); *F03D 1/04* (2013.01); *H02K 1/30* (2013.01); *F05B 2220/00* (2013.01); *F05B 2220/50* (2013.01); *F05B 2240/40* (2013.01); *F05B 2250/82* (2013.01); *Y02B 10/30* (2013.01); *Y02B 10/70* (2013.01); *Y02E 10/725* (2013.01)

(58) Field of Classification Search
USPC ...................................................... 290/44, 55
See application file for complete search history.

(56) References Cited

U.S. PATENT DOCUMENTS

| | | |
|---|---|---|
| 710,277 A | 9/1902 | Kaiser |
| 2,563,279 A | 8/1951 | Rushing |
| 3,902,072 A | 8/1975 | Quinn |
| 4,021,135 A | 5/1977 | Pedersen et al. |
| 4,201,514 A | 5/1980 | Huetter |
| 4,218,175 A | 8/1980 | Carpenter |
| 4,285,481 A | 8/1981 | Biscomb |
| 4,362,470 A | 12/1982 | Locastro et al. |
| 4,456,429 A | 6/1984 | Kelland |
| 4,632,637 A | 12/1986 | Traudt |
| 5,183,383 A | 2/1993 | Baas |
| 5,315,159 A | 5/1994 | Gribnau |
| 5,457,346 A | 10/1995 | Blumberg et al. |
| 5,474,425 A | 12/1995 | Lawlor |
| 6,278,197 B1 | 8/2001 | Appa |
| 7,218,011 B2 | 5/2007 | Hiel et al. |
| 7,315,093 B2 | 1/2008 | Graham, Sr. |
| 7,344,353 B2 | 3/2008 | Naskali et al. |
| 7,352,076 B1 | 4/2008 | Gabrys |

(Continued)

*Primary Examiner* — Tho D Ta
(74) *Attorney, Agent, or Firm* — Stephen H. Hall; Bradley Arant Boult Cummings LLP

(57) ABSTRACT

An improved magnetic generator has been developed that is particularly suitable for creating modular micro wind turbines, although other power generation applications are contemplated. The generator utilizes a series of rotors with axially aligned magnets on each side of the rotor face. As a drive shaft rotates the rotors in proximity to stators, a magnetic flux and electricity is generated. In certain embodiments, the rotors utilize magnet pockets to stabilize the magnets. In the preferred embodiments, layers of magnets are placed in each magnet pocket to achieve magnetic amplification by having multiple magnets, and their respective fluxes, influence the stators.

20 Claims, 33 Drawing Sheets

(56) References Cited

U.S. PATENT DOCUMENTS

| | | |
|---|---|---|
| 7,728,446 B2 | 6/2010 | Hofbauer et al. |
| 7,804,186 B2 | 9/2010 | Freda |
| 7,854,594 B2 | 12/2010 | Judge |
| 7,914,259 B2 | 3/2011 | Godsk |
| 8,674,538 B2 | 3/2014 | Lugg |
| 8,736,098 B2 | 5/2014 | Choi et al. |
| 9,062,654 B2 * | 6/2015 | Yost .................. F03D 1/04 |
| 2003/0137149 A1 | 7/2003 | Northrup et al. |
| 2005/0218656 A1 | 10/2005 | Wobben |
| 2006/0244264 A1 | 11/2006 | Anderson et al. |
| 2007/0110585 A1 | 5/2007 | Bonnet |
| 2007/0222225 A1 | 9/2007 | Mahoney |
| 2008/0095621 A1 | 4/2008 | Chi |
| 2008/0170941 A1 | 7/2008 | Ghosh et al. |
| 2008/0206062 A1 | 8/2008 | Sanz Pascual et al. |
| 2008/0219850 A1 | 9/2008 | O'Connor et al. |
| 2008/0231132 A1 | 9/2008 | Minowa et al. |
| 2008/0272604 A1 | 11/2008 | Versteegh |
| 2008/0293260 A1 | 11/2008 | Christoffersen |
| 2009/0097981 A1 | 4/2009 | Gabrys |
| 2009/0102194 A1 | 4/2009 | M'Ariza Garcia San Miguel et al. |
| 2009/0246033 A1 | 10/2009 | Rudling |
| 2009/0295164 A1 | 12/2009 | Grabau et al. |
| 2009/0309369 A1 | 12/2009 | Llorente Gonzalez |
| 2009/0311099 A1 | 12/2009 | Richards |
| 2010/0001533 A1 | 1/2010 | Jefferson |
| 2010/0026010 A1 | 2/2010 | Pabst |
| 2010/0032954 A1 | 2/2010 | Law |
| 2010/0126086 A1 | 5/2010 | Paggi |
| 2010/0140951 A1 | 6/2010 | Pitre |
| 2010/0183443 A1 | 7/2010 | Thorne |
| 2010/0264663 A1 | 10/2010 | Barber |
| 2010/0266382 A1 | 10/2010 | Campe et al. |
| 2010/0266412 A1 | 10/2010 | Barber |
| 2010/0270799 A1 | 10/2010 | Schmidt |
| 2010/0283245 A1 | 11/2010 | Gjerlov et al. |
| 2011/0049902 A1 | 3/2011 | Miekka et al. |
| 2011/0109100 A1 | 5/2011 | Versteegh |
| 2011/0116927 A1 | 5/2011 | Hancock et al. |
| 2011/0120108 A1 | 5/2011 | Garmong |
| 2011/0233938 A1 | 9/2011 | Stiesdal |
| 2011/0254279 A1 | 10/2011 | Ventzke |
| 2012/0112461 A1 | 5/2012 | Saluccio |
| 2013/0249217 A1 | 9/2013 | Yost |

* cited by examiner

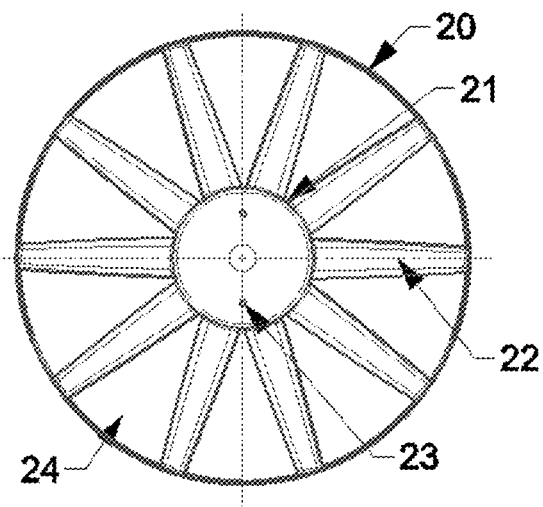
FIGURE 5
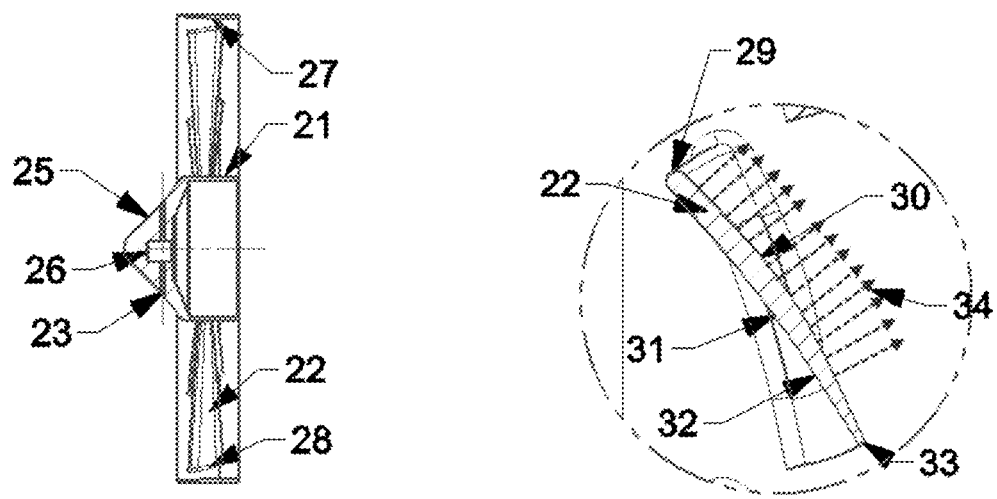
FIGURE 6
FIGURE 7

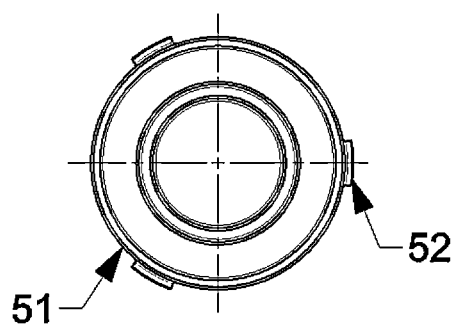# 
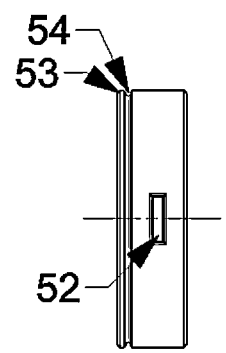
FIGURE 18
FIGURE 19
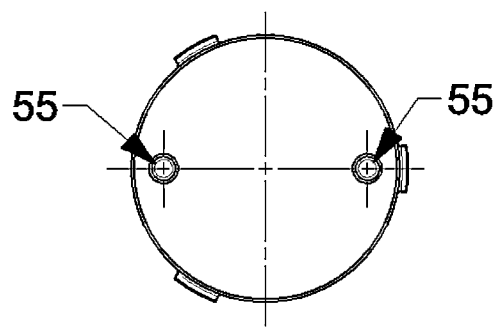
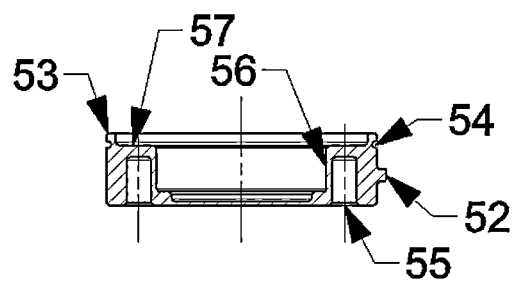
FIGURE 20
FIGURE 21

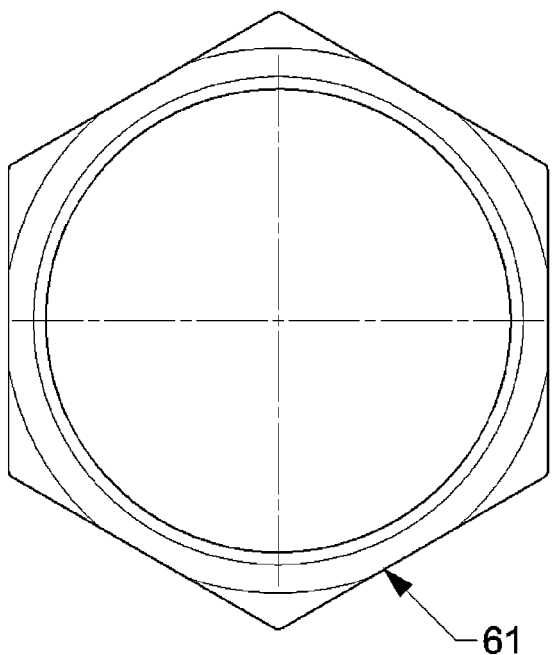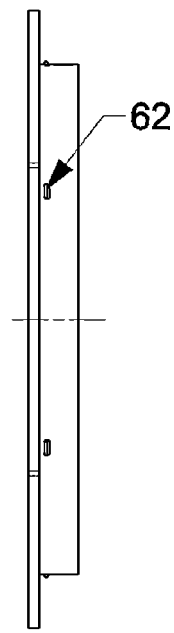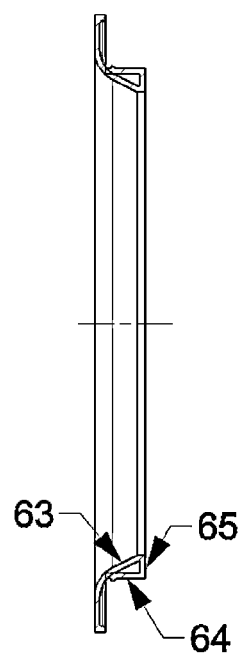
FIGURE 26  FIGURE 27  FIGURE 28
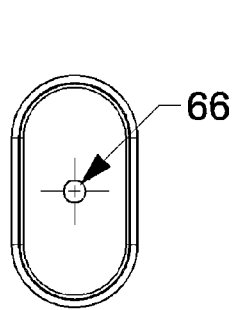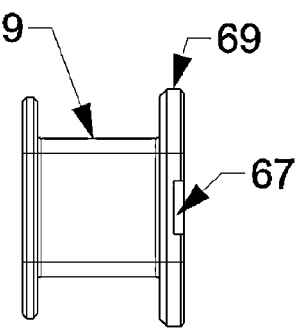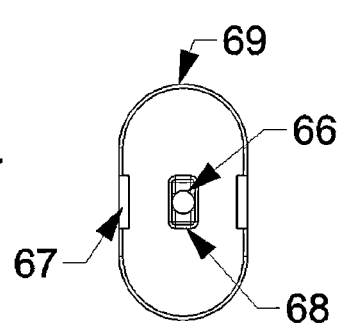
FIGURE 29  FIGURE 30  FIGURE 31

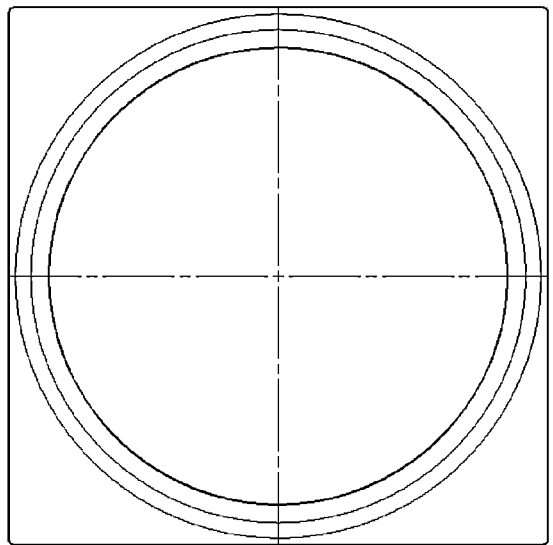
FIGURE 32 — 70
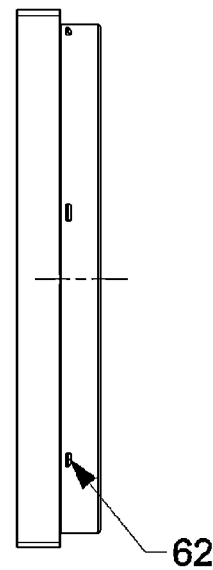
FIGURE 33
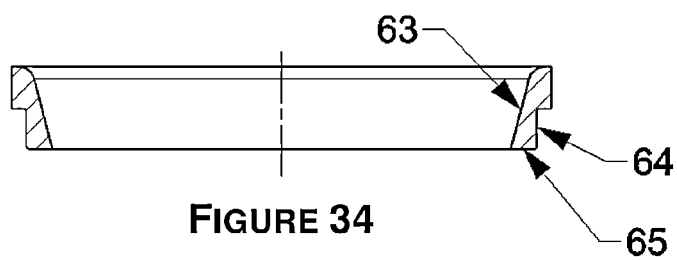
FIGURE 34
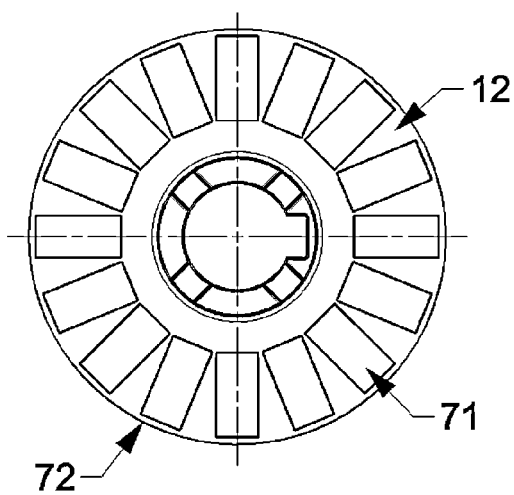
FIGURE 35
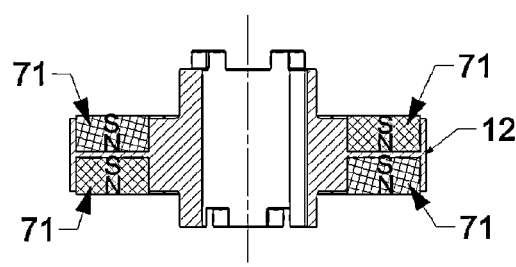
FIGURE 36

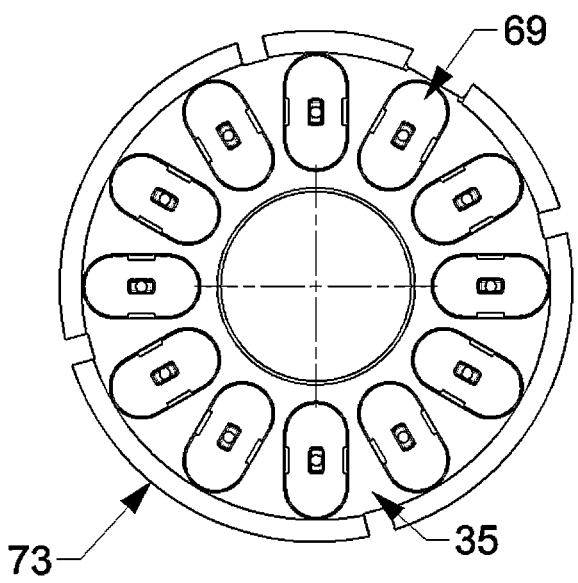
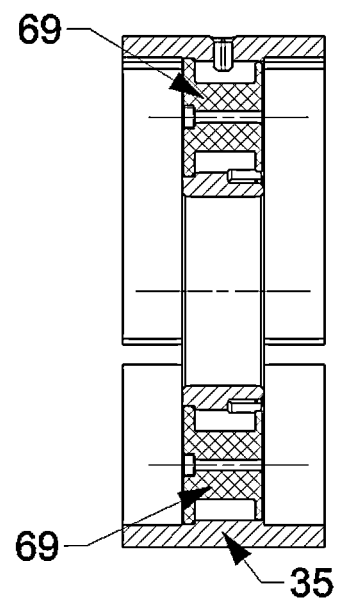
FIGURE 37
FIGURE 38

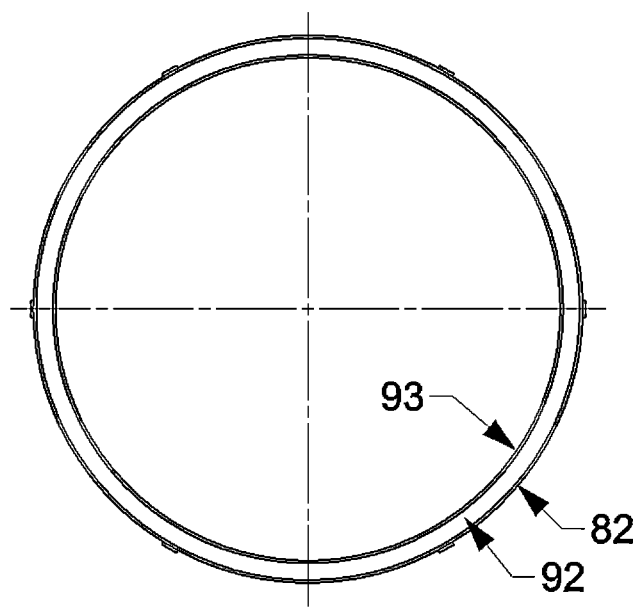
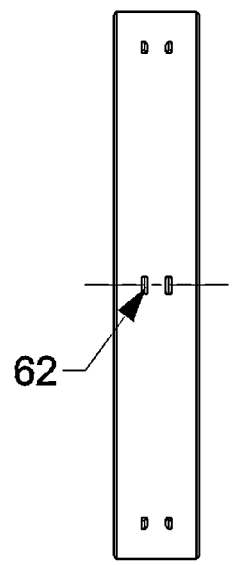
FIGURE 46
FIGURE 47

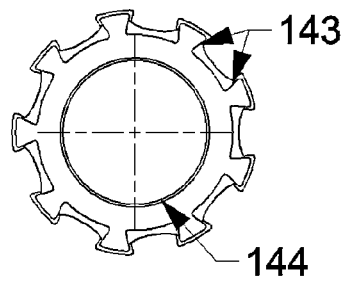
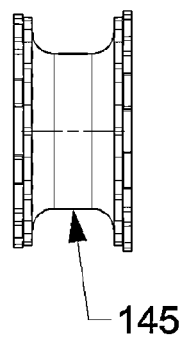
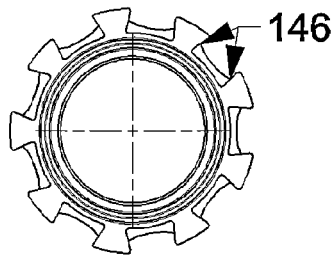
FIGURE 73　　FIGURE 74　　FIGURE 75
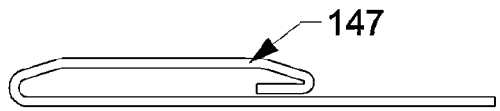
FIGURE 76
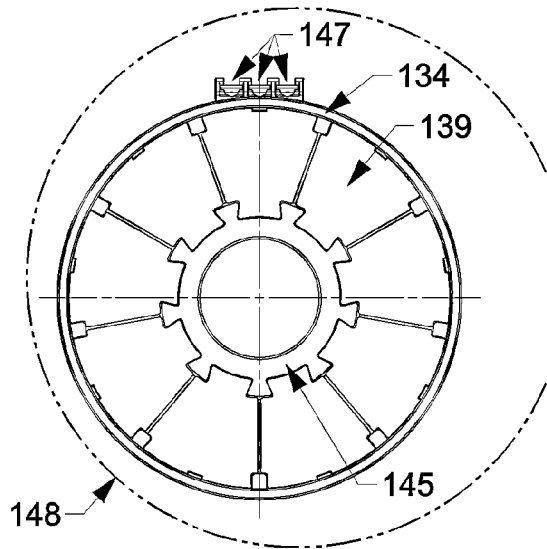
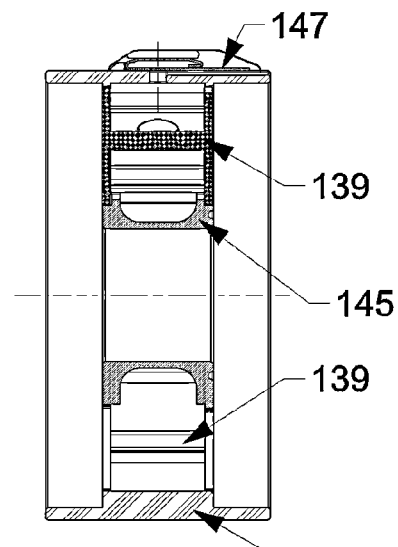
FIGURE 77　　FIGURE 78
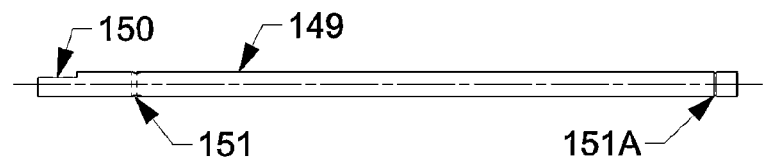
FIGURE 79

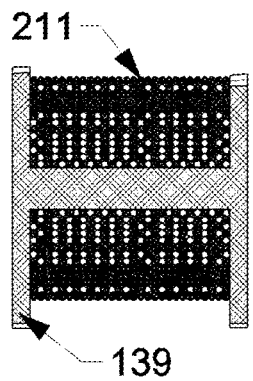
FIGURE 103
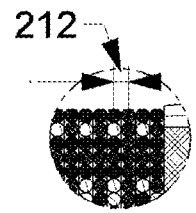
FIGURE 104
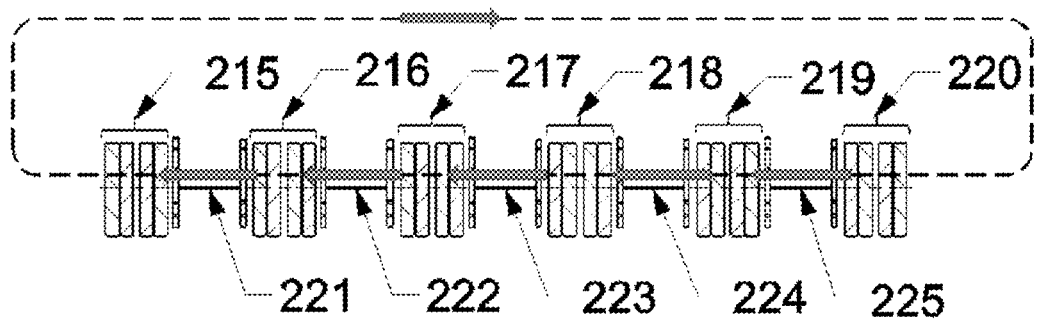
FIGURE 105
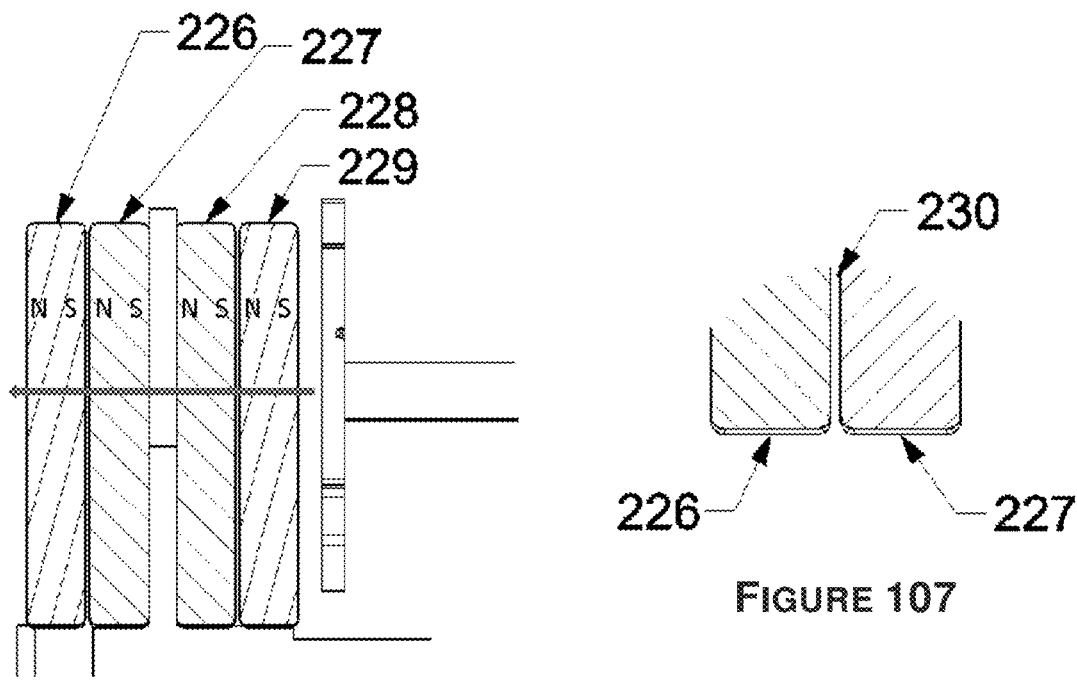
FIGURE 106
FIGURE 107

MODULAR MICRO WIND TURBINE

CROSS-REFERENCE TO RELATED APPLICATIONS

This application is a continuation in part of, and claims the benefit of and priority to, U.S. patent application Ser. No. 13/430,243 titled "Modular Micro Wind Turbine" that was filed on Mar. 26, 2012, all of which is incorporated by referenced herein.

FIELD OF THE INVENTION

The present invention relates generally to a modular micro wind turbine for generating electricity. More specifically, in some embodiments the present invention relates to a ducted micro wind turbine containing more than two power generating units.

BACKGROUND ART

Centralized power distribution can have major impact to communities when the distribution system is taken down either from natural or man-made disasters. Solar panel production can provide some amount of power if the distribution system goes down. However, clouds frequently block the collection of energy to allow solar panel energy production. Solar panels also stop power generation during the night time hours.

One potential solution is large commercial grade wind turbines that generate significant amounts of power. However, these large commercial grade generators must be located away from the consumers. Distribution and transmission systems are required to move the power from the large commercial generation facility to the consumers. Large commercial grade wind turbines cannot operate in high wind conditions due to the inertia generated by the large turbine blades. Consequently, a need exists for smaller micro wind turbines that can provide a localized, efficient source of electrical energy.

SUMMARY OF THE INVENTION

In some aspects and some embodiments, the invention relates to an electric generator comprising a drive shaft and a series of alternating stators and rotors configured along said drive shaft, said series of rotors comprising an initial rotor, a first main rotor, and a second main rotor, and said series of stators comprising a first stator between said initial rotor and first main rotor, and a second stator between said first main rotor and second main rotor, and wherein said first and second main rotors comprise a plurality of axially aligned opposite magnet pockets on each side of the first and second main rotors, each of the opposite magnet pockets containing at least one axially aligned magnet, and wherein the at least one axially aligned magnet in each of the magnet pockets are oriented such that opposite magnetic poles face each other, wherein the two axially aligned magnets of the first main rotor and the two axially aligned magnets of the second main rotor create a magnetic flux in the second stator when rotated about the drive shaft. In some embodiments each magnet pocket contains two or more magnets separated by a non-magnetic magnet spacer. In some embodiments, the non-magnetic spacer is less than 0.10 inches thick, the magnets are pie-shaped and radially arranged around each side of the rotor, and the magnet pockets are between ½ and ⅛ inches in depth. In some embodiments, the axially aligned magnets are separated by an opposite magnet separator that is non-magnetic and less than 0.10 inches thick.

In some aspects and some embodiments, the invention relates to an improved magnetic rotor assembly, comprising a circular rotor having a plurality of magnet pockets radially arranged on each face of the circular rotor and a central drive shaft bore, a drive shaft extending through the central drive shaft bore; and a plurality of magnets, wherein magnets are seated in said magnet pockets on each face of the circular rotor in a first layer on each face so that the polarity of each magnet is opposite the polarity of the opposite magnet at both ends of the magnet. In some embodiments, the invention can include a second layer of magnets seated in each magnet pocket on each face, where the second layer is located directly below the first layer and so that the polarity of each magnet in the first layer is opposite the polarity of each magnet in the second layer at both ends of the magnet; and a non-magnetic magnet spacer between said first layer of magnets and second layer of magnets. In various embodiments, the magnets can be pie-shaped, non-magnetic spacers 0.1 inches thick or less can be used, and two or more circular rotors can be used in series, and the gap between the rotors is 1.0 inches or less. In some embodiments, the magnets have a magnetism value of 6112-10068 gauss. In some embodiments, the circular rotor can have 4 or more magnet pockets on each face of the circular rotor.

In some aspects and some embodiments, the invention relates to an improved magnetic generator core, comprising a central housing with a hollow interior; a drive shaft extending through the interior of the central housing; multiple magnetic rotor assemblies located within the housing around the drive shaft, where each rotor assembly comprises, a circular rotor having a first face and a second face, said first and second circular rotor faces each having a plurality of radially arranged magnets forming a first layer and a second layer of magnets on each face, so that the polarity of each magnet is opposite the polarity of the opposite magnet at both ends of the magnet; and at least one stator disposed between the rotor assemblies. As discussed, in some embodiments, the first and second layers of magnets on each rotor face can be separated by a non-magnetic spacer. In some embodiments, the rotor assemblies utilize magnet pockets while others do not. In some embodiments, the total depth of the combined first and second layers of magnets on each face of the rotor is between ½ and ⅛ inch in depth. In some embodiments the magnets on said first and second rotor faces are separated by an opposite magnet separator that is non-magnetic and less than 0.06 inches thick. In some embodiments the non-magnetic spacer is less than 0.1 inches thick.

Other aspects and advantages of the invention will be apparent from the following description and the appended claims.

BRIEF DESCRIPTION OF DRAWINGS

It should be noted that identical features in different but related drawings are generally shown with the same reference numeral. However, when different embodiments are shown, different reference numerals may be used for similar features in the different embodiments.

FIG. 5 is a view of a multi blade wind turbine fan that drives the direct displacement generator in accordance with one embodiment of the present invention.

FIG. 6 is a cross-sectional view of FIG. 5.

FIG. 7 is a cross-sectional view of a single wind turbine blade airfoil design in FIG. 5 in accordance with one embodiment of the present invention.

FIG. 18 is a non-fan end cap holding the bearing and seal in accordance with one embodiment of the present invention.

FIG. 19 is a side view of FIG. 18 showing the locking attachment and seal groove.

FIG. 20 is a back side view of FIG. 18 showing the spanner wrench holes.

FIG. 21 is a cross-sectional view of FIG. 18 showing internal design.

FIG. 26 is a view of a hexagonal end cap holding the fan turbine case into the modular hexagonal housing in accordance with one embodiment of the present invention.

FIG. 27 is a side view of FIG. 26.

FIG. 28 is a cross-sectional view of FIG. 26 showing the inlet design.

FIG. 29 is an end view of the spool which holds the magnetic wire in accordance with one embodiment of the present invention.

FIG. 30 is a side view of FIG. 29.

FIG. 31 is a back end view of FIG. 29.

FIG. 32 is a square end cap holding the fan turbine case into the modular square housing in accordance with one embodiment of the present invention.

FIG. 33 is a side view of FIG. 32.

FIG. 34 is a cross-sectional view of FIG. 32 showing the inlet design.

FIG. 35 is a main rotor with the rare earth magnets assembled in accordance with one embodiment of the present invention.

FIG. 36 is a cross-sectional view of the main rotor in accordance with one embodiment of the present invention.

FIG. 37 is an end view of the stator assembly with the magnetic wire spools mounted in accordance with one embodiment of the present invention.

FIG. 38 is a cross-sectional view of FIG. 37.

FIG. 46 is a view of a modular linear case connector in accordance with one embodiment of the present invention.

FIG. 47 is a side view of FIG. 46.

FIG. 73 shows a view of the center mounting section for the spools in accordance with one embodiment of the present invention.

FIG. 74 shows the side view of FIG. 73 in accordance with one embodiment of the present invention.

FIG. 75 shows the back view of FIG. 73 in accordance with one embodiment of the present invention.

FIG. 76 shows a side view of the electronic spring in accordance with one embodiment of the present invention.

FIG. 77 shows an assembly of several components to form the stator section of the generator and power will be generated by the stator section in accordance with one embodiment of the present invention.

FIG. 78 shows a cross section of FIG. 77 in accordance with one embodiment of the present invention.

FIG. 79 shows an alternative embodiment of the main drive shaft where the keyway slot has been removed and using a cross pin in accordance with one embodiment of the present invention.

FIG. 103 shows a cross-section of the wiring of the spools showing uniformity in the wiring process to maximize the length of wire in each spool in accordance with one embodiment of the present invention.

FIG. 104 shows an expanded view of FIG. 103 in accordance with one embodiment of the present invention.

FIG. 105 shows one embodiment using five sets of stator coils and six sets of magnets where the magnetic flux flows continuously through each of the magnet sets causing increased magnetic flux between adjacent magnet sets.

FIG. 106 shows an embodiment of four magnets, two within each pocket and a spacer between the magnets.

FIG. 107 shows two magnets with a non-magnetic spacer between each magnet.

DETAILED DESCRIPTION

Figure 1:
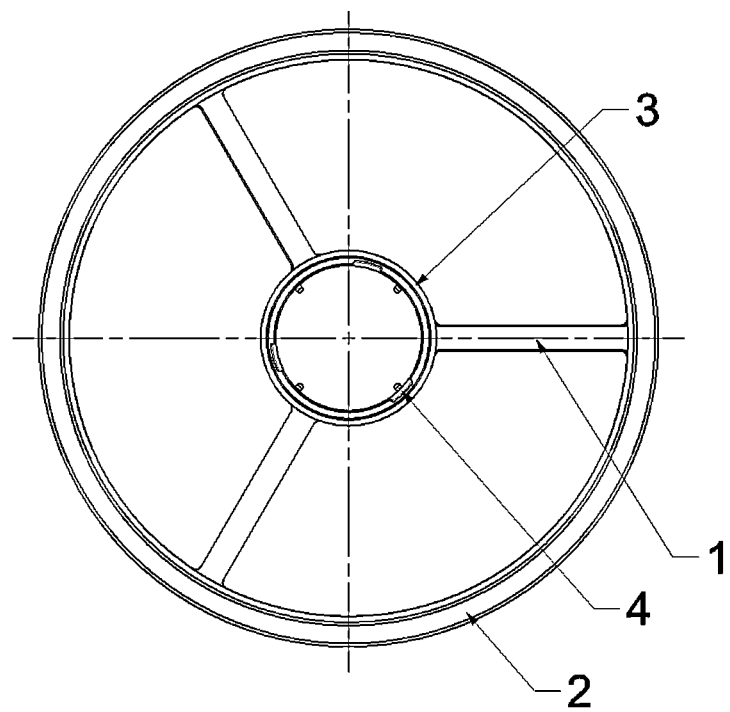
FIG. 1 is an end view of the modular wind turbine generator and fan case in accordance with one embodiment of the present invention.

Various embodiments may have one or more of the components outlined below. Component reference numbers used in the Figures are also provided.

Generator case support
Cowling 2
Generator case 3
Stator alignment key 4
Locking attachment key 5
Turbine blade shroud 6
Turbine case wire routing channel 7
External wire routing channel 8
Internal wire routing channel 9
Turbine case stop 10
Turbine case housing 11
Main rotor 12
Rotor drive key 13
Rotor hub 14
Rotor bore 15
Master drive key slot 16
Magnet pocket 17
Rotor drive slot 18
Rotor magnet gap 19
Turbine blade stabilizer ring 20
Turbine blade hub 21
Turbine airfoil blades with rotational twist 22
Attachment pin 23
Airfoil blades gap 24
Nose cone 25
Main drive shaft hub 26
Compression bore 27
Bore interface radius 28
Leading edge of blade 29
Low pressure side of airfoil 30
Concave airfoil surface 31
High pressure side of airfoil 32
Trailing edge of blade 33
Low pressure lift 34
Stator 35
Wiring slot 36
Stator alignment slot 37
Coil pocket 38
Stator bore 39
Stator hub 40
Wire hole 41
Stator 42
Spool face 43
Rotor end with slots 44
Rotor end with keys 45
Snap ring grooves 46
Main drive keyway slot 47
Drive pin for turbine blade fan 48
Main drive shaft turbine blade mount 49
Main drive shaft 50
End bearing cap and seal 51
Locking attachment tab 52
Stator face 53
Seal groove 54
Non-magnetic bearing mount 56
Rotor clearance 57
End cap with shaft seal 58
Main drive shaft bore 59
Main drive shaft seal 60
Hexagonal end cap 61
Modular case attachment tab 62
Air compression bore 63
Modular hub 64
Wind turbine case face 65
Spool winding bore 66
Spool locking surface 67
Spool winding orientation notch 68
Magnetic wire winding spool 69
Modular square end cap 70
Permanent magnets 71
Main rotor assembly 72
Stator assemblies 73
Non-magnetic bearings 74
Snap ring 75
Single drive key
Generator core 77
Initial Rotor (front) end assembly with drive slot 78
Final Rotor (back) end assembly with drive slot 79
Dovetail 80
Back stop 81
Internal bore 82
Orientation tab 83
Clearance area 84
Dovetail slot 85
Wire channel 86
Back tab slot 87
Front tab slot 88
Spool winding tray 89
Hexagonal modular case 90
Square modular case 91
Linear case connector 92
Interface bore 93
Stator with integrated coils 94
Generator core 95
Coiled magnetic wire 96
Permanent magnet 100
Wedge back 101
Wedge front 102
Front generator rotor 109
Opposite magnet separator 110
Shear pin hole 111
Center hole for drive shaft 112
Magnet pocket 113
Orientation tang 114
Standard tang 115
Neighboring magnet separator 116
Center generator rotor 117
Center rotor opposite magnet separator 118
Center rotor slots 119
Center rotor tang 120
Center rotor center hole for drive shaft 121
Center rotor magnet pocket 122
Center rotor orientation tang 123
Center rotor tang 124
Center rotor neighboring magnet separator 125
Back generator rotor 126
Back rotor opposite magnet separator 127
Back rotor slots 128
Back rotor center hole for the drive shaft 129
Back rotor magnet pockets 130
Back rotor orientation slot 131
Back rotor slot 132
Back rotor neighboring magnet separator 133
Generator stator case 134
Alignment rails 135
Spool alignment rails 136
Hard wiring channels 137
Modular slots 138
Generator spools 139
Generator spool front tang 140
Generator spool rail slot 141
Generator spool back tang 142
Generator spool mount slot 143
Stator bore 144

Generator spool mount 145
Front spool mount slot 146
Generator electrical spring 147
Generator stator assembly 148
Generator drive shaft 149
Generator shaft flat 150
Shear pin hole 151
Snap ring groove 151A
Front rotor end assembly 152
Magnet south pole 153
Magnet north pole 154
Front rotor opposite magnet separator 155
Center rotor assembly 156
Back rotor assembly 157
Front seal cap 158
Front seal cap grooves 159
Outer seal groove 160
Inner shaft seal groove 161
Non-magnetic bearing hole 162
Shaft clearance hole 163
Spanner wrench hole 164
Back seal cap 165
Back seal cap grooves 166
Back seal outer groove 167
Non-magnetic bearing hole 168
Spanner wrench hole 169
Non-magnetic bearings 170
Snap ring 171
Shear pin 172
Generator core 173
Blade gap 175
Outer stabilizer ring 176
Stabilizer ring taper 177
Center hub 178
Convex surface 180
Concave surface 181
Trailing edge 182
Leading edge 183
Turbine blade hole 185
Internal flat 186
Set screw 187
Wind turbine case 188
Large mounting lug 189
Electrical conduit lug 190
Small mounting lug 191
Generator core mounting surface 192
Front seal cap mounting surface 193
Locking lug for front seal cap 194
Locking lug for back seal cap 195
Back seal mounting surface 196
Electrical transmission wiring hole 197
Electrical transmission rails
Mounting slots 200
Orientation slot for generator stators 201
Electrical power slot 202
Electrical connector mounting surface 203
Square wind turbine case 204
Square case mounting lugs 205
Square case mounting tangs 206
Square case mounting slots 207
Hexagon wind turbine case 208
Aligned wind turbine cases 209
Side-by-side wind turbine cases 210
Magnetic wire 211
Uniform winding 212
Magnets set #1 215
Magnet Set #2 216
Magnet Set #3 217
Magnet Set #4 218
Magnet Set #5 219
Magnet Set #6 220
Coil for Stator #1 221
Coil for Stator #2 222
Coil for Stator #3 223
Coil for Stator #4 224
Coil for Stator #5 225
Magnet #1 226
Magnet #2 227
Magnet #3 228
Magnet #4 229
Non-magnetic Spacer 230
Magnetic Flux Field Around a Magnet 231
Magnetic Flux Field Between Magnets 232

The present invention provides a modular small low cost wind turbine generator that affords substantially increased energy production with the ability to integrate into existing structures in the rural, suburban, urban and highly dense cities. In some embodiments, some of the generator components, for example the rotors, can be created using selective laser sintering and/or 3D stereolithography printing processes. The micro wind turbines can be easily connected to other micro wind turbines to form a larger generation panel similar to solar panels. These panels of wind turbines can be located at the edge of any building structure such as walls, fences, decks, roof tops, roof peaks or in a standalone system, or also used on vehicles. The generators can also be used in other non-wind applications, for example, using water currents, waves, etc, to generate electricity as described herein. For simplicity and consistency, however, the turbines will generally be referred to herein as wind turbines.

The ability to connect multiple modular wind turbines improves the overall capture of wind currents. Less wind current escapes the micro wind turbine design as compared to small to larger designs and improves the overall effectiveness of each adjacent micro wind turbine. An example is holding a hand into the wind has relative little resistance, however, holding a plywood panel against the same wind current will generally knock down the individual holding the panel in the wind. Multiple micro wind turbines enhance the power generation performance significantly.

Electric vehicle market is ever growing, but struggling with issues of distance to be traveled with a single vehicle charge. Besides Tesla Automotive, most of the electric vehicles have a range of less than 50 miles on battery only. The micro wind turbine will fit nicely within the automotive market due its compact size. Micro wind turbines can be mounted externally on the roof of the car/truck or be integrated into the frame of the vehicle. The typical electric vehicle uses about 3 kilo watts of power at the maximum power draw. Some embodiments of a single micro wind turbine can generate up to one (1) kilo watt of power. Thus, in those embodiments, four micro wind turbines can be mounted on the roof or internally to create up to four (4) kilo watts of power exceeding the maximum requirements of an electric vehicle.

The micro wind turbine can work in other embodiments such as creating auxiliary power for aircraft. Lithium Ion batteries are used in many commercial aircraft due to their weight to power ratio. However on long distances, the amount of power required to maintain auxiliary equipment require significant larger battery packs. There have been issues with some batteries catching fire in route. The micro wind turbine may not be as applicable at high aircraft speeds. However, by extracting a portion of the wind velocity, it could provide enough wind velocity to allow the micro wind turbine to generate additional power while in flight. The weight to power ratio for a micro wind turbine is more efficient than larger lithium ion battery packs and potentially far safer.

The micro wind turbine fan is constructed to be sustainable in high wind currents due to the design of the wind turbine blades and housing. The blades preferably attach to the outer housing eliminating the bending and fracture effects of individual blades during high wind currents. The blade design also works in low wind currents in the range of 2-4 mph due to the preferred design using rotational twist and concave nature of the airfoil design. Other blade designs known to those of skill in the art can also be used. The housing surrounding the fan blades also increases the performance of the airfoils by not allowing wind current to escape off the tips of the turbine blades. The preferred wind turbine blade airfoil is designed with a low pressure side which improves the performance of the turbine blades causing the blades to spin faster in the rotational axis overcoming the power generation system and the friction produced by the bearings.

The inlet housings for the micro wind turbine preferably compacts the air increasing the velocity of the air and density of the air flowing through the micro wind turbine fan blades. This compression increases the overall performance of each micro wind turbine generator. While compression is preferred, it is not required.

The modular design of the micro wind turbine allows multiple wind turbines to be connected, if desired, either in a large grid pattern or in a chain of micro wind turbines behind one another or in combination with both grid pattern and a chain configuration. This design allows the micro wind turbines to be placed in and around any structure near the power consumption needs.

The micro wind turbine has multiple (more than two) power generators in some embodiments. Each power generator can produce substantial energy. Due to the design of the power generators and the permanent magnets, the design adds efficiencies in the power output. Maintaining close proximity of adjacent magnets adds to the power generated within each magnetic wire coil set increasing individual power generating unit output to increase the total power output. The micro wind turbine generating units may be installed in a sealed housing allowing for implementation in high humidity and severe weather conditions.

Figure 2:
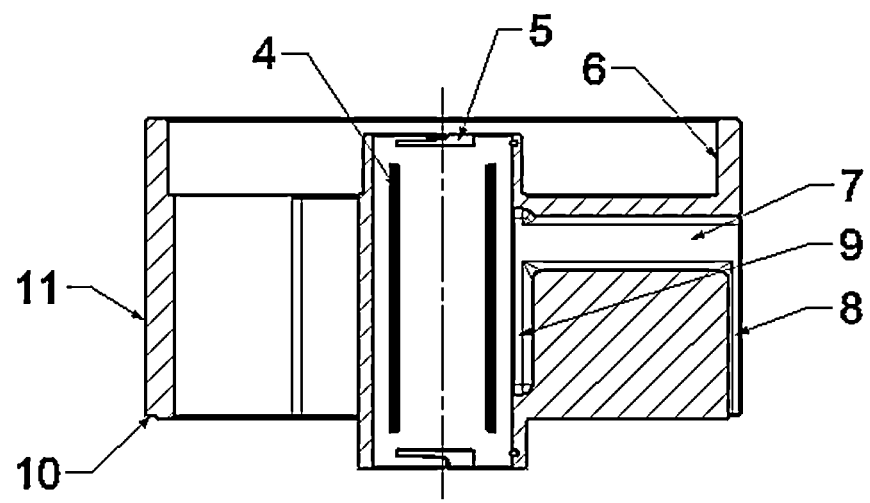
FIG. 2 is a cross-sectional view of FIG. 1.
Figure 39:
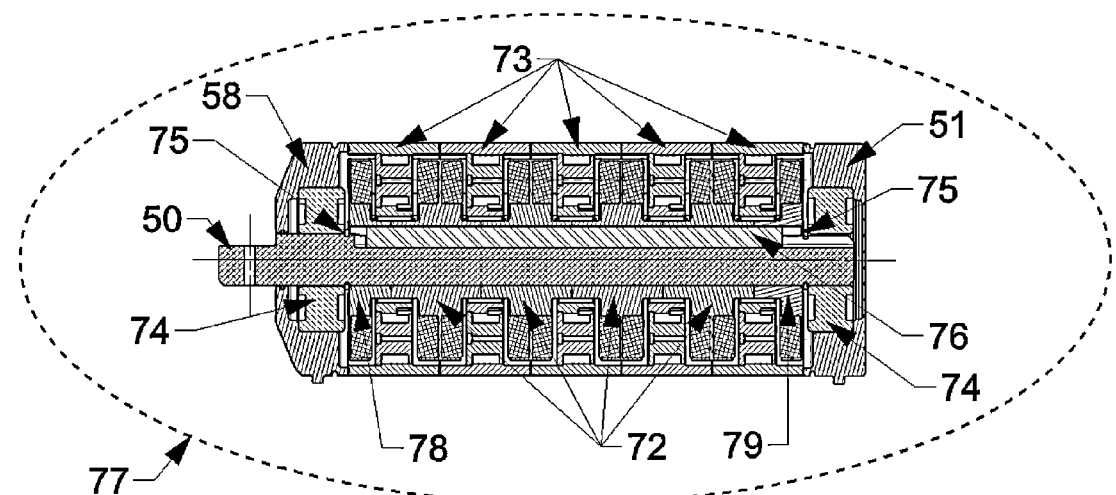
FIG. 39 is a cross-sectional view of the assembly of the generator.
Figure 40:
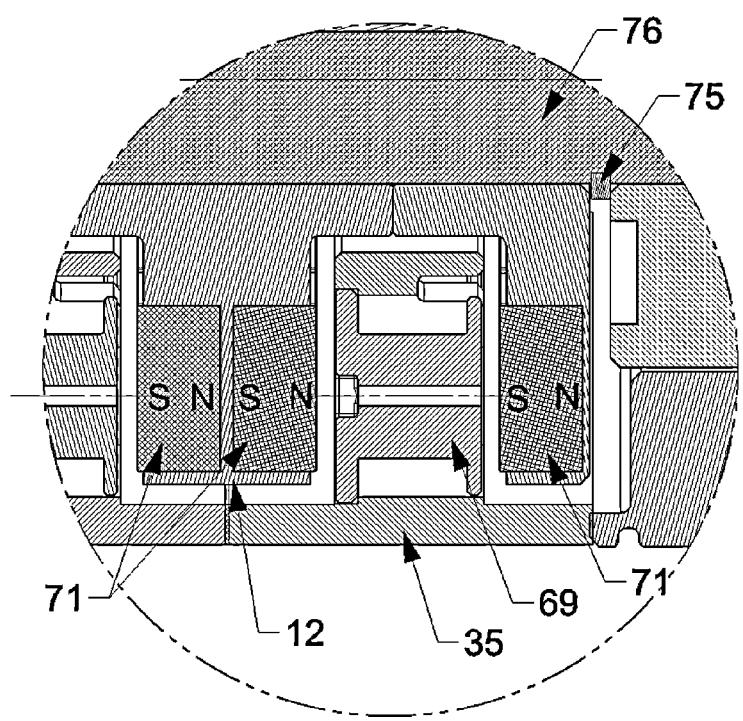
FIG. 40 is an exploded view of FIG. 39 detailing the wire spools, rotors, stator and magnets.
Figure 41:
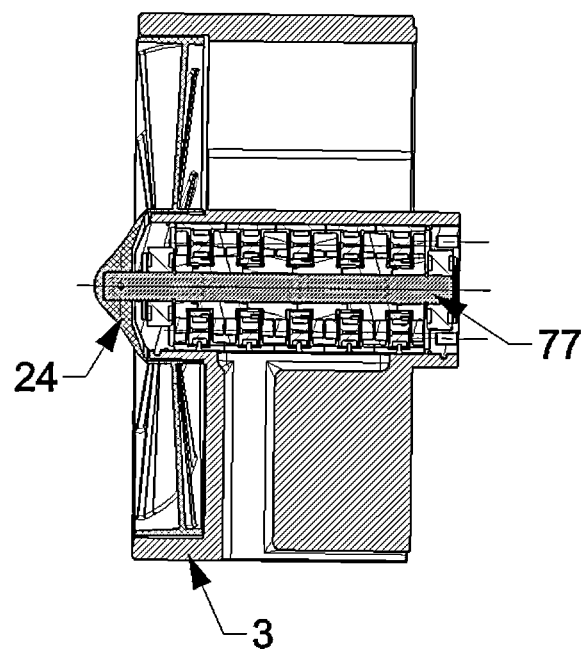
FIG. 41 is a cross-section of the micro wind turbine fan and generator assembly in accordance with one embodiment of the present invention.
Figure 42:
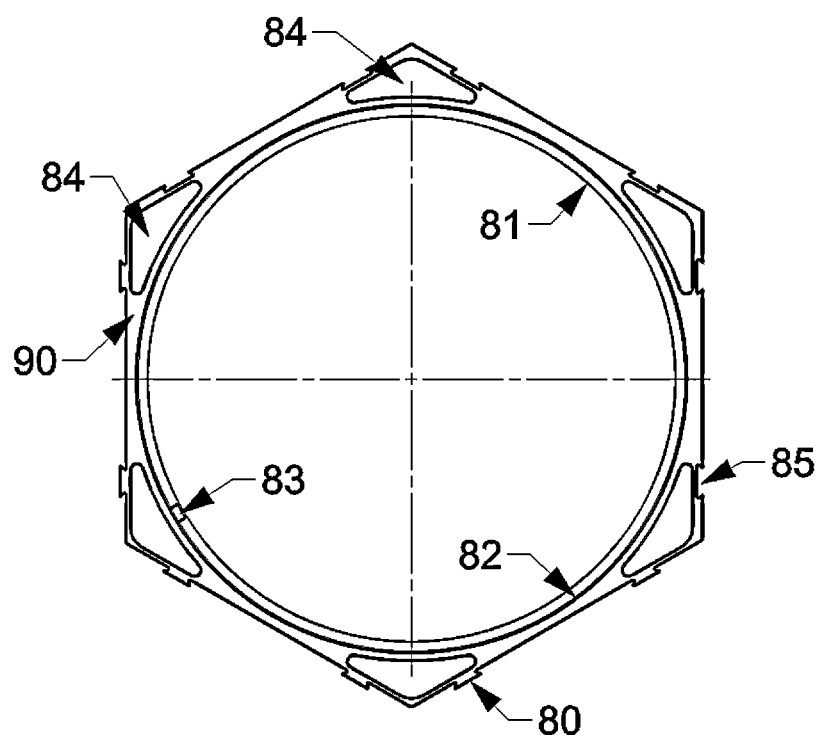
FIG. 42 is a view of a hexagonal modular case in accordance with one embodiment of the present invention.
Figure 43:
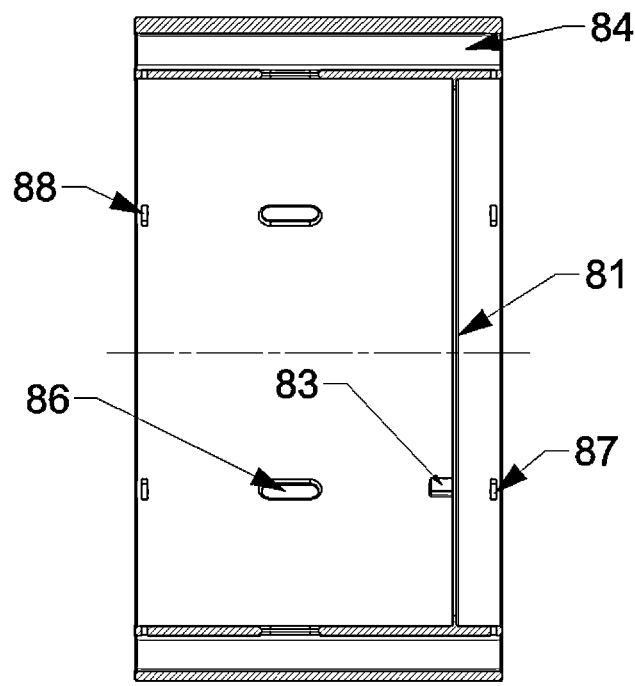
FIG. 43 is a cross-sectional view of FIG. 42.
Figure 44:
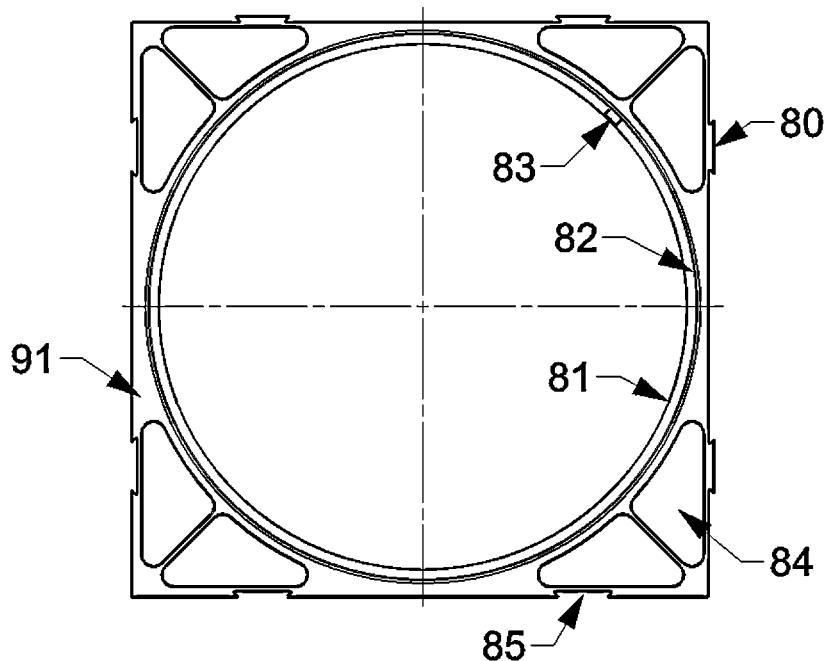
FIG. 44 is a view of a square modular case in accordance with one embodiment of the present invention.
Figure 45:
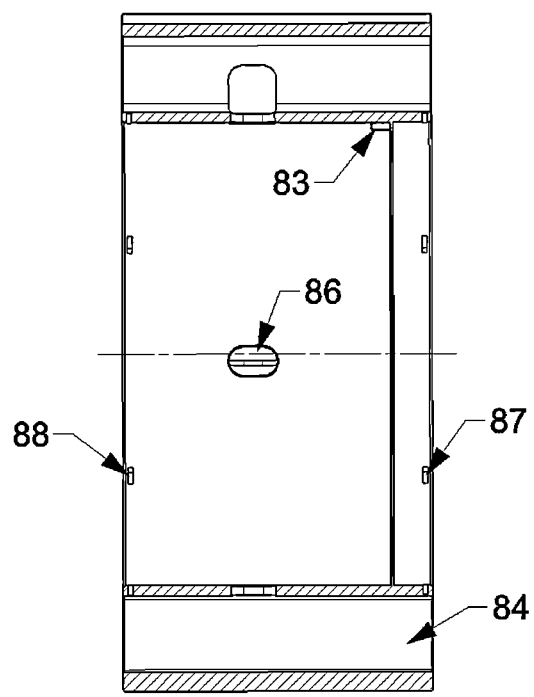
FIG. 45 is a cross-sectional view of FIG. 44.

One embodiment of the generator core 77 (FIG. 39) is mounted in the generator case 3 (FIG. 1). FIG. 1 is an end view of the generator and fan case of one embodiment, and also shows a generator case support 1, cowling 2, and stator alignment key 4. The turbine case housing 11 (FIG. 2) is optionally mounted in a modular assembly case consisting of hexagonal modular case 90 (FIG. 42) or square modular case 91 (FIG. 44), although other shapes can also be used. The turbine case housing 11 (FIG. 2) can be directly integrated in the shaped case or structure. The embodiment shown in FIG. 2 also depicts a locking attachment key 5, turbine blade shroud 6, turbine case wire routing channel 7, external wire routing channel 8, internal wire routing channel 9, and turbine case stop 10 used in this embodiment.

One embodiment of the hexagonal modular case 90 (FIG. 42) or the square modular case 91 (FIG. 44) can be connected together using the dovetail 80 (FIGS. 42 & 44) mating with attached cases via the dovetail slot 85 (FIGS. 42 & 44) in order to form a larger array structure of micro wind turbines.

One embodiment of the hexagonal modular case 90 (FIG. 42) or the square modular case 91 (FIG. 44) can be connected in a linear chain using the modular linear case connector 92 (FIG. 46) by attaching the modular cases using the modular case attachment tab 62 (FIGS. 42, 44 and 46) in order to form a structure to collect more power from stronger wind current conditions.

Figure 50:
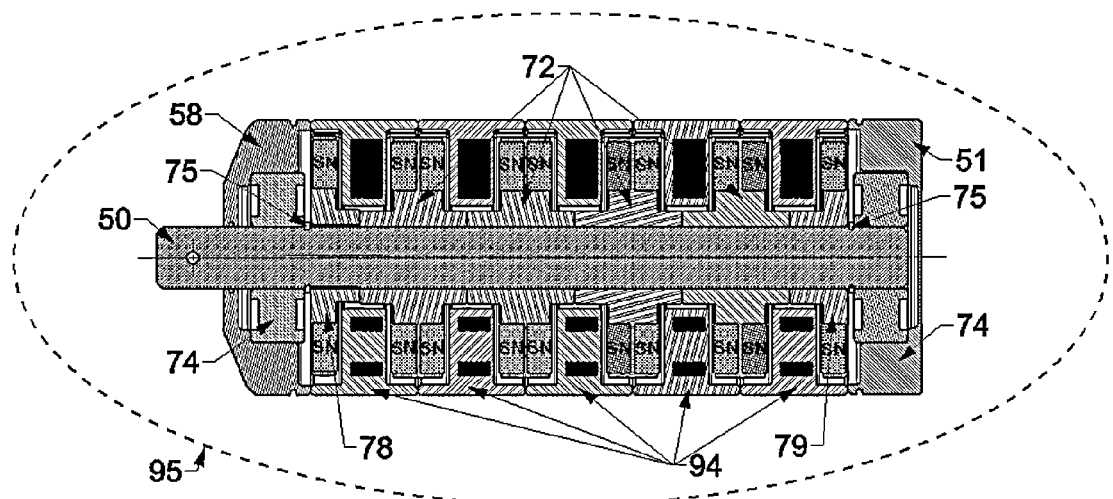
FIG. 50 is a cross-sectional view of the assembly of the generator with integrated coils in accordance with one embodiment of the present invention.
Figure 51:
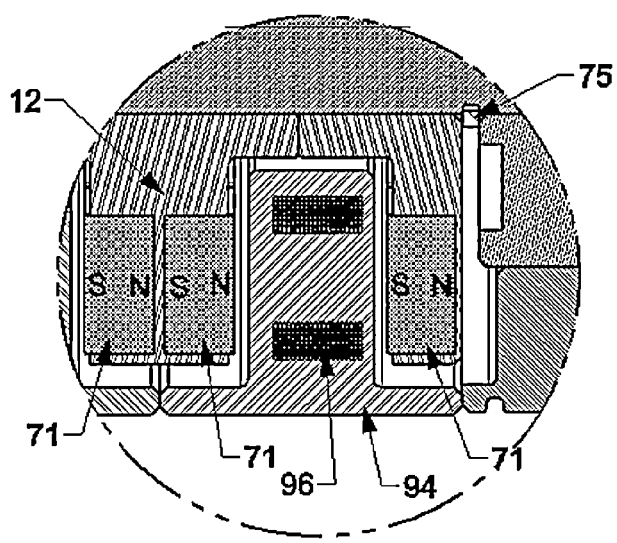
FIG. 51 is an exploded view of FIG. 50.
Figure 52:
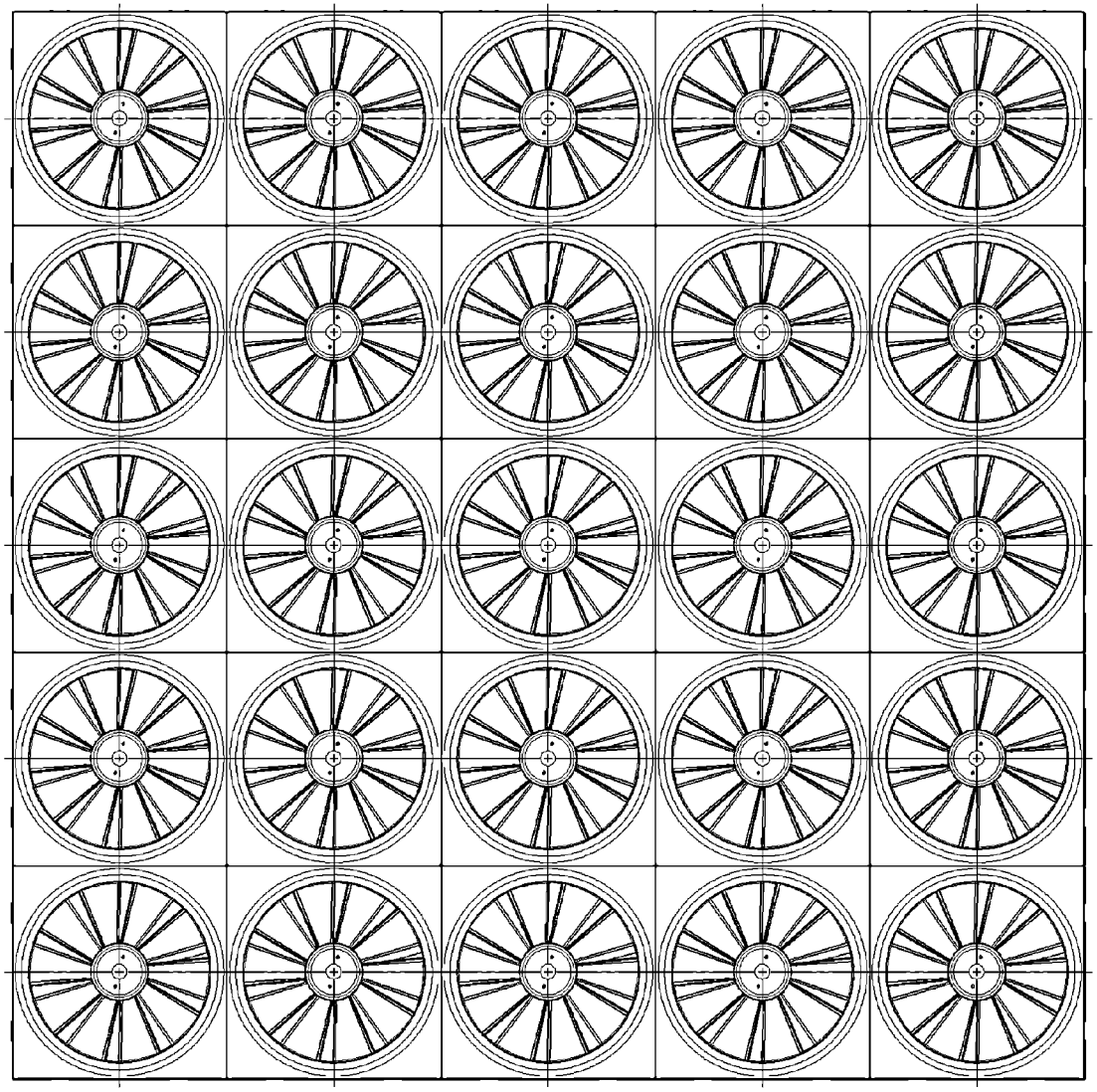
FIG. 52 is a view of a square modular micro wind turbine arrangement in accordance with one embodiment of the present invention.
Figure 53:
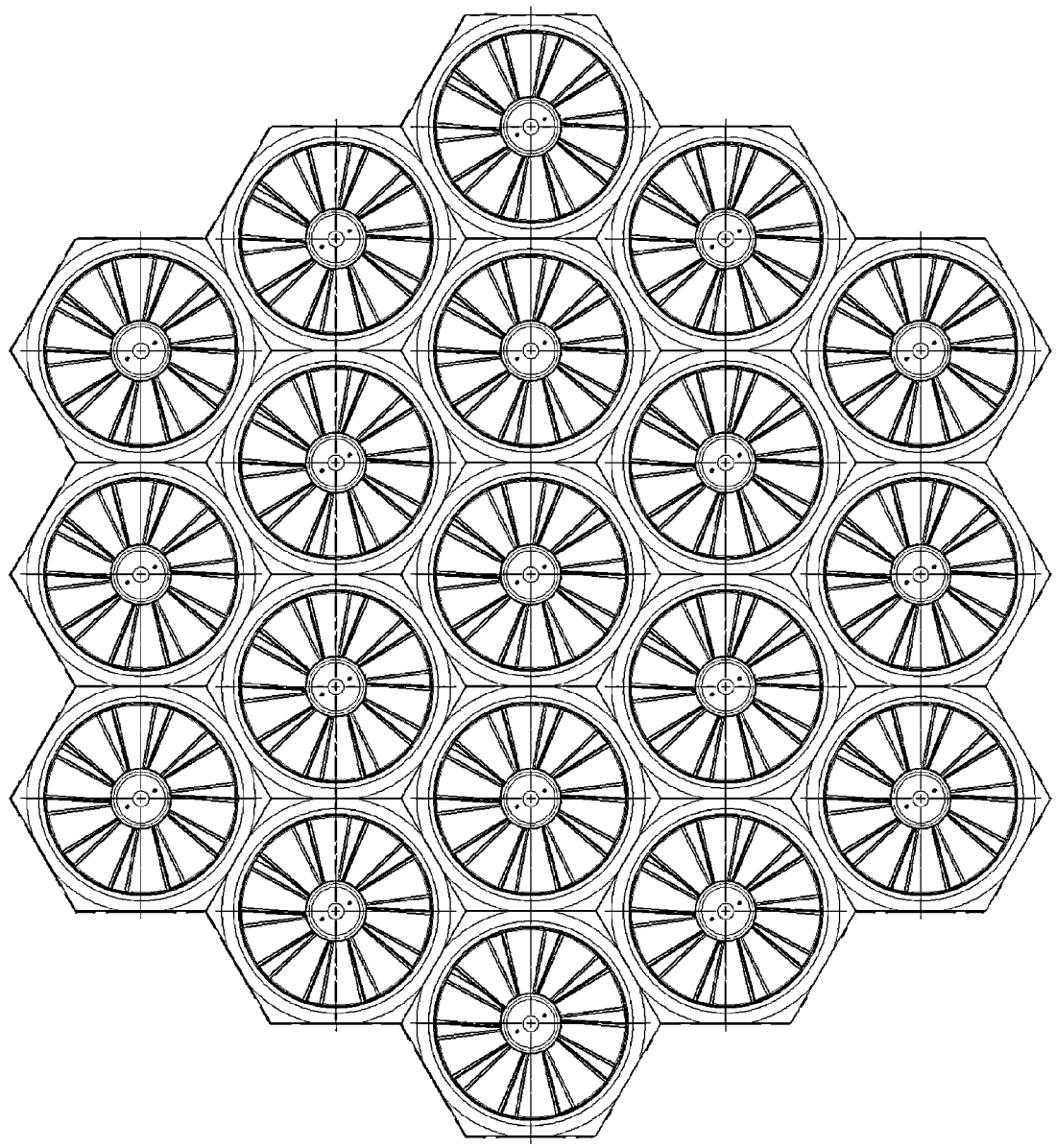
FIG. 53 is a view of a hexagon modular micro wind turbine arrangement in accordance with one embodiment of the present invention.

One embodiment of the generator core 95 (FIG. 50) is an assembly of main drive shaft 50, end cap with shaft seal 58, two non-magnetic bearings 74, two snap rings 75, rotor end assembly with drive slots 78 (also referred to herein as "initial rotor" or "front rotor"), one or more stator with integrated coils 94, one or more main rotor assembly 72 (also referred to herein as "central rotor"), rotor end assembly with drive slots 79 (also referred to herein as "back rotor" or "last rotor"), drive key 76 (FIG. 39), and an end bearing cap with seal 51.

One embodiment of the generator core 77 (FIG. 39) is an assembly of main drive shaft 50, end cap with shaft seal 58, two non-magnetic bearings 74, two snap rings 75, rotor end assembly with drive slots 78 (also referred to as "initial rotor" or "front rotor"), one or more stator assemblies 73, one or more main rotor assembly 72, rotor end assembly with drive slots 79 (also referred to as "back rotor" or "last rotor"), drive key 76, and an end bearing cap with seal 51.

Figure 48:
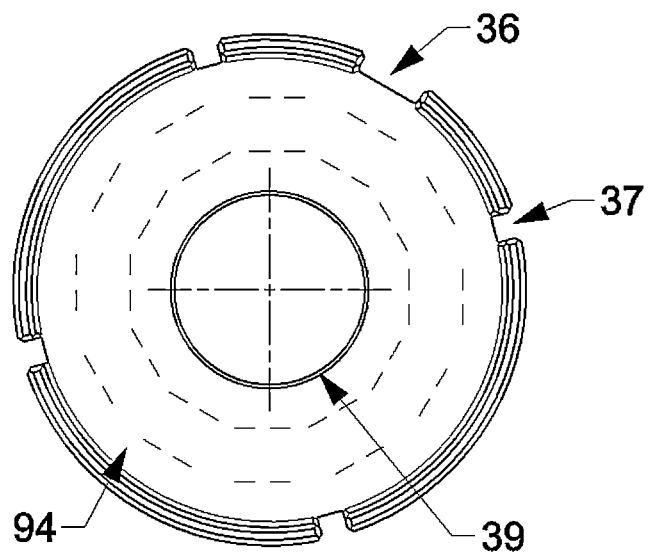
FIG. 48 is a view of a stator with integral coils in accordance with one embodiment of the present invention.
Figure 49:
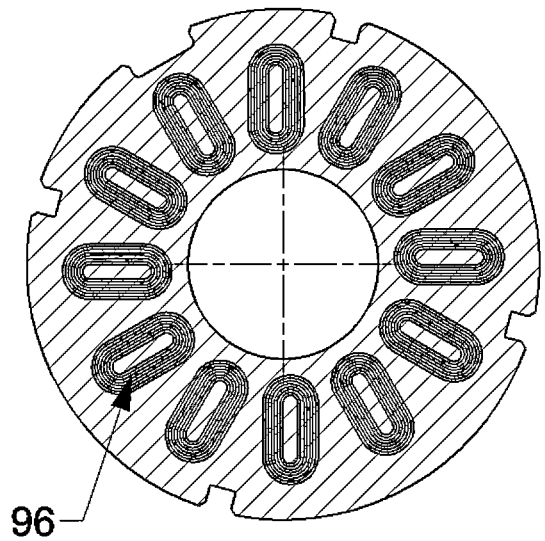
FIG. 49 is a cross-sectional view of FIG. 48.

One embodiment of the stator with integrated coils 94 is shown in FIG. 48 and FIG. 49, and shows stator alignment slots 37, the wiring slot 36, and the magnetic wire coiled 96 integrated internally to the stator material. The number of magnetic wire coils 96 contained within stator follows the ratio of magnets to coils shown in the chart below for a three phase design:

| Coils | Magnets | Coils/Phase |
|-------|---------|-------------|
| 3     | 4       | 1           |
| 6     | 8       | 2           |
| 9     | 12      | 3           |
| 12    | 16      | 4           |
| 15    | 20      | 5           |

Another embodiment of the stator assembly 73 is shown in FIG. 37 and FIG. 38, and shows a stator 35 and the magnetic wire winding spool 69 and the magnetic wire. The ratio of magnetic wire winding spools to the number of magnets is shown in the above chart for a three phase design. One embodiment of the main rotor (also referred to as a "central rotor") assembly 72 shown in FIG. 35 and FIG. 36 discloses a main rotor 12 and the permanent magnets. The ratio of magnetic wire spools to the number of magnets is shown in the above chart for a three phase design, or other phase designs.

One embodiment of the modular square end cap 70 is shown in FIG. 32-34, and in this embodiment, shows the four sided shape of the design, modular case attachment tabs 62, the modular hub 64, the wind turbine case face 65 and the air compression bore 63. The air compression bore 63 increases the velocity of the air flowing into the micro wind turbine which increases the forces needed to turn the wind turbine fan and blades 24 (FIG. 5).

One embodiment of the magnetic wire winding spool 69 is shown in FIG. 29-31, and in this embodiment, discloses a spool winding bore 66, the spool winding tray 89, the spool locking surface 67 and the spool winding orientation notch 68. Magnetic wire is wound around the magnetic wire winding spool 69 and then inserted into the stator assembly 73 (FIG. 37). The number if magnetic wires wound around the spool identify the amount of voltage derived from each of the spools.

One embodiment of the modular hexagon end cap 61 is shown in FIG. 26-28, and in this embodiment, shows the six sided shape of the design, modular case attachment tabs 62, the modular hub 64, the wind turbine case face 65 and the air compression bore 63. The air compression bore 63 increases the velocity of the air flowing into the micro wind turbine which increases the forces needed to turn the wind turbine fan and blades 24 (FIG. 5).

One embodiment of the end cap with shaft seal 58 is shown in FIG. 22-25, and in this embodiment, shows a main drive shaft bore 59, the spanner wrench holes 55, the locking attachment tab 52, the seal groove 54 (FIG. 25), the stator face 53, the rotor clearance 57, the non-magnetic bearing mount 56, and the main drive shaft seal 60. The end caps provide the preferred seals to better allow the micro wind turbine to operate in humid/wet conditions. The end cap with shaft seal 58 is designed to be located on end closest to the airfoil blades 24.

One embodiment of the end bearing cap and seal 51 is shown in FIG. 18-21, and in this embodiment, shows the spanner wrench holes 55, the locking attachment tab 52, the seal groove 54 (FIG. 21), the stator face 53, rotor clearance 57 and the non-magnetic bearing mount 56. The end caps provide the preferred seals to better allow the micro wind turbine to operate in humid/wet conditions. The end bearing cap and seal 51 is designed to be located on the end farthest away from the airfoil blades 24.

Figures 15, 16, 17:
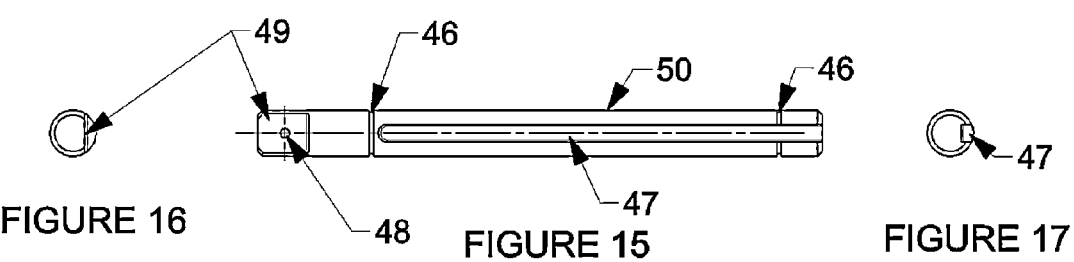
FIG. 15 is a view of a main drive shaft of the modular wind turbine fan and generator in accordance with one embodiment of the present invention.
FIG. 16 is an end view from the fan side of FIG. 15.
FIG. 17 is an end view from the non-fan side of FIG. 15.
Figure 22:
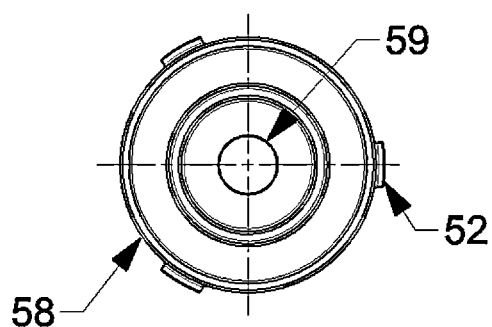
FIG. 22 is a fan end cap holding the bearings, seal and drive shaft in accordance with one embodiment of the present invention.
Figure 23:
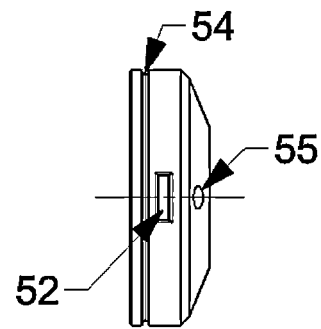
FIG. 23 is a side view of FIG. 22 showing the locking attachment tab and the seal groove.
Figure 24:
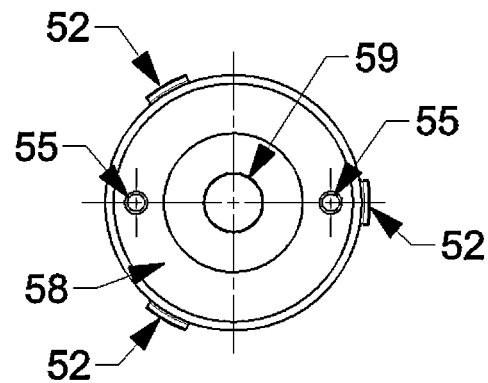
FIG. 24 is a back view of FIG. 22 showing the spanner wrench holes.
Figure 25:
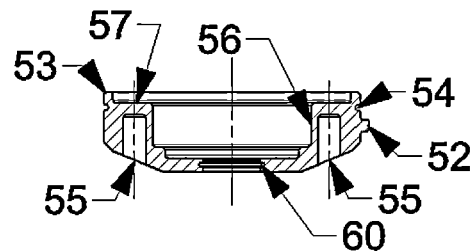
FIG. 25 is a cross-sectional view of FIG. 22.

One embodiment of the main drive shaft 50 is shown in FIG. 15-17, and in this embodiment, shows snap ring grooves 46, the main drive keyway slot 47, main drive shaft turbine blade mount 49 and the drive pin for the turbine blade fan 48.

Figure 13:
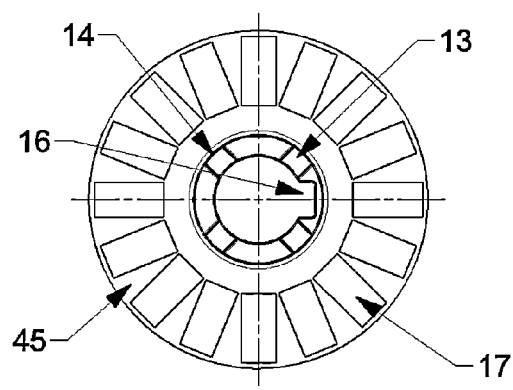
FIG. 13 is an end view of the last rotor without magnets for the generator in accordance with one embodiment of the present invention.
Figure 14:
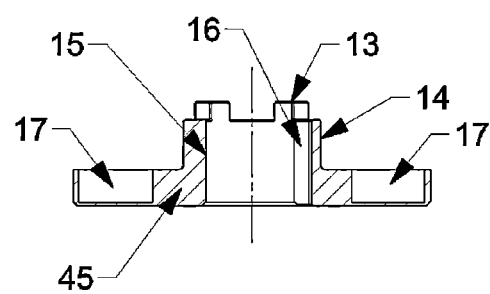
FIG. 14 is a cross-sectional view of FIG. 13.

One embodiment of the rotor end with keys 45 (also referred to as the "back rotor" or "last rotor") is shown in FIG. 13-14, and in this embodiment, shows a rotor drive key 13, the rotor hub 14, rotor bore 15, master drive key slot 16 and the magnet pockets 17. The ratio of magnetic wire winding spools to the number of magnets is shown in the chart above for a three phase design.

Figure 11:
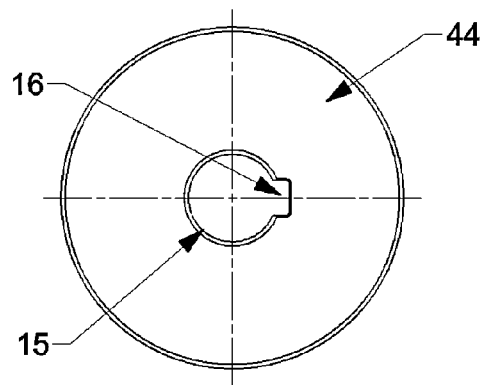
FIG. 11 is an end view of the initial rotor without magnets for the generator in accordance with one embodiment of the present invention.
Figure 12:
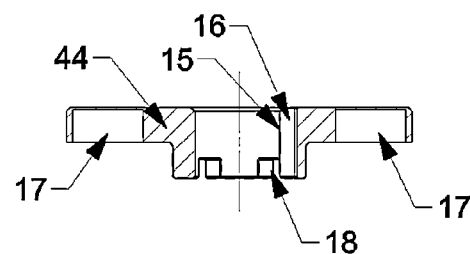
FIG. 12 is a cross-sectional view of FIG. 11.

One embodiment of the rotor end with slots 44 (also referred to as the "initial rotor" or "front rotor") is shown in FIG. 11-12, and in this embodiment, shows a rotor bore 15, master drive key slot 16, magnet pockets 17 and the rotor drive slots. The ratio of magnetic wire winding spools to the number of magnets is shown in the chart above for a three phase design. In alternative designs, the interfacing slots and keys used on the back rotor and initial rotor can be alternated, or other interfacing configurations can be used.

Figure 8:
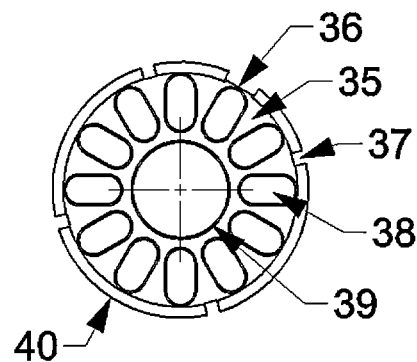
FIG. 8 is an end view of the stator used to hold the spools of magnetic wire in accordance with one embodiment of the present invention.
Figure 9:
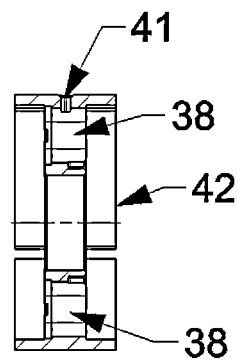
FIG. 9 is a cross-sectional view of FIG. 8.
Figure 10:
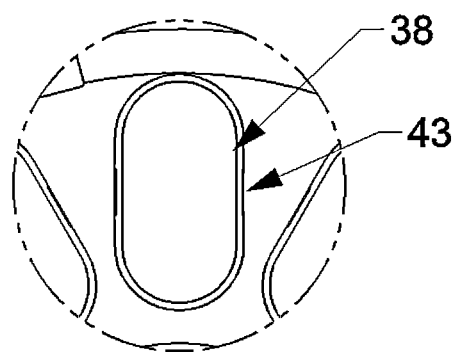
FIG. 10 is an exploded view of the locking mechanism holding the spools into the stator in accordance with one embodiment of the present invention.

One embodiment of the stator 35 is shown in FIG. 8-9, and in this embodiment, shows a wiring slot 36, the stator alignment slot 37, coil pocket 38, stator bore 39 and the stator hub 40. The ratio of coil pockets to the number of magnets is shown in the chart above for a three phase design.

One embodiment of the wind turbine fan with airfoil blades 24 is shown in FIG. 5-7, and in this embodiment, discloses a turbine blade hub 21, turbine airfoil blades with rotational twist 22, attachment pin 23, nose cone 25, main drive shaft hub 26 and the turbine blade stabilizer ring 20. The turbine blade stabilizer ring 20 has several effects on the wind turbine fan: 1) during high wind current conditions the ends of the fan blades would normally deflect for which the stabilizer ring reduces the deflection and allows the wind turbine to operate in the higher wind conditions; 2) the stabilizer ring compresses the wind current through the wind turbine increasing the wind force applied to the turbine airfoil blades; 3) wind current normally leaving the ends of airfoils creates turbulence for which stabilizer ring eliminates and increases the performance of the airfoils. The nose cone 25 directs wind current around the turbine blade hub 21 and the generator core 77 with power generators (for example, FIG. 39). The turbine blade hub 21 covers the generator core 77 increasing the protection of the generator core 77 from the elements.

One embodiment of the turbine airfoil blades with rotational twist 22 is shown in further detail in FIG. 7, and discloses a low pressure side of airfoil 30 which has the shape of the upper side of a wing and a high pressure side of airfoil 32 and the concave airfoil surface 31 collects the wind current to enable the rotation of the fan blades. As the turbine fan increases the rotational speed, the low pressure side of the airfoil 30 reduces the pressure allowing the turbine blades to rotate with increased velocity. The rotational twist enables the lower speed of the wind current at the turbine hub 21 with the higher speed of the wind at the turbine blade stabilizer ring 20.

Figure 3:
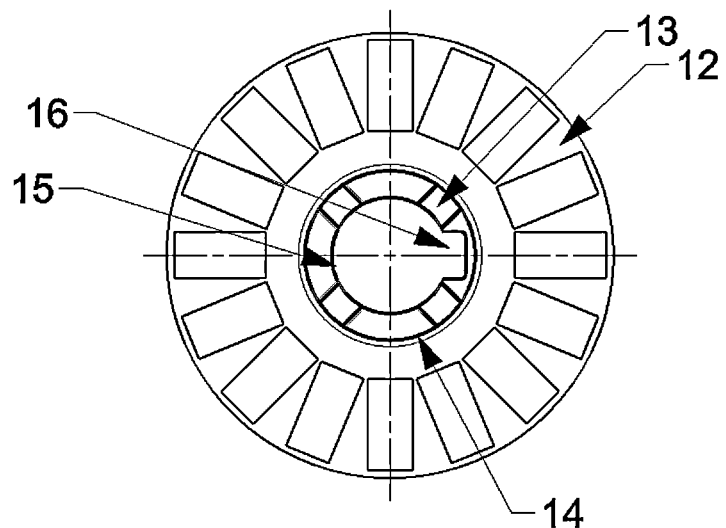
FIG. 3 is a view of a main rotor used in the generator section without the magnets in accordance with one embodiment of the present invention.
Figure 4:
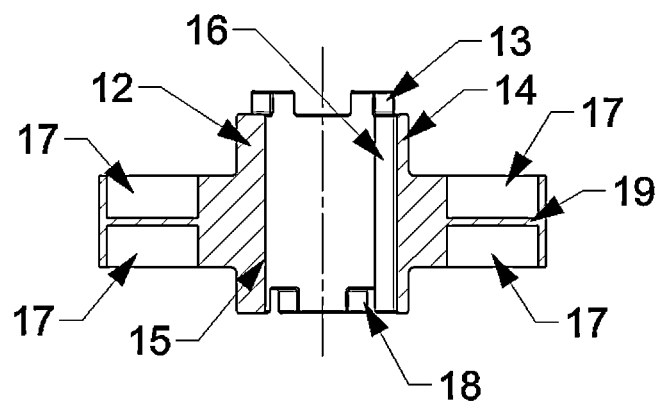
FIG. 4 is a cross-sectional view of FIG. 3.

Another embodiment of the main rotor 12 is shown FIG. 3-4, and in this embodiment, discloses a rotor drive key 13, the rotor hub 14, rotor bore 15, master drive key slot 16, magnet pockets 17, rotor drive slot 18 and the rotor magnet gap 19. Combining magnets on both sides of the rotor reduces the functional space within the generator providing for more power generating units. The rotor magnet gap 19, if reduced, increases the overall efficiencies of the generating core by allowing adjacent magnets to increase the power to adjacent stator units. Increasing the gap reduces the effect of adjacent magnets to adjacent stator units. The rotor drive keys 13 drives adjacent rotors by inserting the key into the rotor drive slot 18 which relieves the stress on the single drive key 76.

An exemplary embodiment of the invention captures the energy of wind currents by utilizing multiple air foil blades in modular micro wind driven turbine that produces electrical power utilizing a series of permanent magnets direct drive generators that produces power that varies with wind speed. One embodiment of the modular micro wind turbines can be located adjacent to sides of buildings, building roofs, other vertical structures (fences), in line with wind generating currents or in a variable direction standalone structure. In one embodiment modular micro wind turbines are placed at a side of a building. In another embodiment modular micro wind turbines are placed along the top of a fence. In another embodiment modular micro wind turbines are placed at the edge or peak of a roof. One embodiment of the modular micro wind turbines can be integrated within a building structure to obscure viewing of the micro turbine. In another embodiment, the modular micro wind turbine can be elevated off the ground on a pole or support structure. A modular micro wind turbine drives a series (three or more) of internal permanent magnet direct drive generators. The axis of rotation is horizontal to the wind current. The micro wind turbines can be installed in multiple directions to accept varying wind currents as changes in wind currents change over seasons and with weather conditions. The modular micro wind turbine operates within a range of low wind currents (2-4 mph) to extremely high wind currents (60+ mph). In other embodiments, the micro wind turbine is mounted in a rotatable fashion so that it rotates to a position to face the strongest wind flow.

Still other embodiments of the invention could be mounted on an aircraft or an automobile in order to provide localized power generation to onboard devices, recharge batteries, or even power the vehicle itself. It is important to realize that other embodiments of the invention could be used as water driven turbines instead of wind. Such examples could be mounted on boats or permanent structures where the turbines are exposed to fluid flow.

A micro wind turbine generator may be located in an urban community, attached to nearby structures such as a house, a deck, a fence, near the roof top or at the roof line to capture wind currents that are generated around and over normal urban structures. Micro wind turbines may be capable of being attached to other micro wind turbines similar to solar cells are attached to one another to create a solar panel. The micro wind turbine needed to be made modularized to be arranged in a pattern that would be acceptable in urban communities generally hidden from normal viewing. These micro wind turbines preferably generate enough power to operate refrigerators, freezers, televisions, radios, provide backup power for home computers, charge cell phone batteries and operation of landline telephones. This type of system would not require commercial distribution and transmission lines but could be easily integrated within the consumer electrical systems. The micro wind turbines is capable of operating in high and low wind conditions. The micro wind turbines are easily maintained by the consumer and be inexpensive to install.

The micro wind turbine could be attached to commercial building structures to provide battery backup support systems for businesses, extending the life of their battery systems. In some cases the power could be extended for a duration that would allow the utility companies time to re-establish the distribution and transmission grid in the event of a power outage.

In other embodiments, a widely distributed power generation system could work in a fashion using the current distribution and transmission facilities in concert with micro wind turbines. Businesses and homes scattered throughout the country could be power generation units using the micro turbines. Each small power generation system would operate in a standalone environment and the excess power would be distributed to other consumers. If the individual power generation units did not supply enough energy then the system would consume power from the external power grid. This widely distributed system would be more secure than centralized power generation systems. When natural or man-made disasters occur, the widely distributed system allows the economy to continue to function normally.

There are alternative embodiments of the permanent magnet arrangement and configurations, as well as various components of the micro turbine, as shown FIGS. 54-104. In some embodiments, rare-earth magnets are used, for example, neodymium grade N45. In some embodiments, permanent rare-earth magnets arranged in close proximity (typically less than or equal to 0.060 inch, although larger gaps can be used) creates an "magnetic amplification" effect to adjacent magnets and increases the power output through the associated coils for these embodiments. References in the chart below refer to FIGS. 56-61.

TABLE 1

| FIG. | Ref. # | Gap (Inch) | Gauss * (Magnetism) | Magnet Count | % Change 2 to n magnets | % Change 4 to 6 magnets |
|---|---|---|---|---|---|---|
| 56 | 103 | .04 | 7752 | 2 | — | — |
| 57 | 104 | .60 | 4536 | 2 | — | — |
| 58 | 105 | .04 | 9768 | 4 | +26% | — |
| 59 | 106 | .60 | 5715 | 4 | +26% | — |
| 60 | 107 | .04 | 10068 | 6 | +29.9% | +3% |
| 61 | 108 | .60 | 6112 | 6 | +34.7% | +6.9% |

* Measurements taken by a NIST certified gauss meter.

The arrangement of the permanent magnets as defined within these embodiments have a material effect on the energy produced by the generator. As noted in the table 1 above, the closer the magnets, the higher the magnetic field strength. This in effect creates higher energy output. The magnetic amplification shown by mounting four magnets in the close proximity shows the optimum amplification in some embodiments. The compact generator embodiment is preferred for the micro wind turbine embodiment.

In the above table, the larger referenced gap (0.60 inch) may be an exemplary gap for the stator, and the smaller referenced gap (0.04 inch) may be an exemplary thickness of the opposite magnet separator 110, 118, 127, 155. In this context, the term "opposite magnet" refers to the magnet(s) on opposite sides of the rotor. While the term "opposing magnets" could be used, the term "opposite magnets" is used to avoid any confusion that "opposing magnets" relates to how similar magnetic poles may repel, or oppose, each other. The stator gap can be larger or smaller, and the thickness of the opposite magnet separator can be larger or smaller, for example, 0.25 inches or less, or more preferably 0.10 inches or less, or even more preferably 0.025 inches or less. As described further below, adjacent magnets that are not separated by the opposite magnet separator (for example, those in a magnet pocket on one face of the rotor) may utilize magnet spacers which may be less than 0.10 inches thick, and preferably less than 0.04 inches thick. For example, in FIG. 58, the first and second magnets may be separated by a magnet spacer, the second and third magnets separated by the opposite magnet separator, and the third and fourth magnets separated by a magnet spacer (e.g., the first two magnets on one face of the rotor and the last two magnets on the other face of the rotor). As another example, in FIG. 59, the first and second magnets may be separated by the opposite magnet separator, with the 0.6 inch gap for the stator, and the third and fourth magnets separated by the opposite magnet separator (e.g., the first two magnets on one rotor separated by an opposite magnet separator, and the last two magnets on a separate rotor and separated by an opposite magnet separator). The opposite magnet separator is preferably made of non-magnetic material, for example, plastic.

Figure 54:
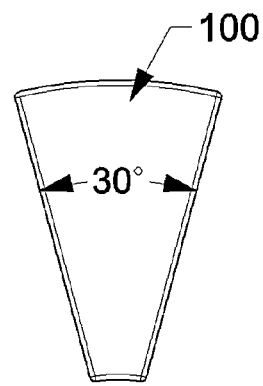
FIG. 54 shows an alternative embodiment of the shaped magnet shown in FIG. 35 to expand the magnetic surface area.
Figure 55:
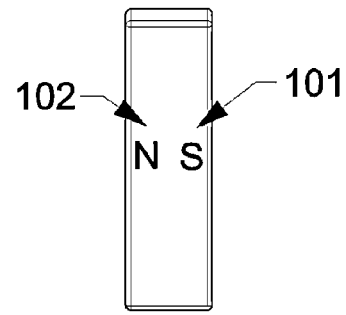
FIG. 55 shows the magnetism orientation where the magnetism is through the thickness of the magnet in accordance with one embodiment of the present invention.
Figure 56:
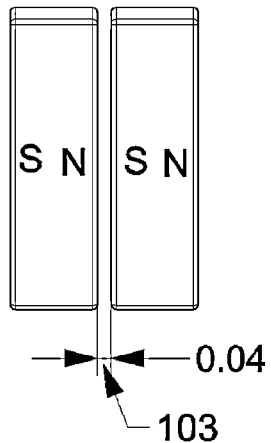
FIG. 56 shows a distance between two magnets and how magnetism is affected by the distance between two magnets in accordance with one embodiment of the present invention.
Figure 57:
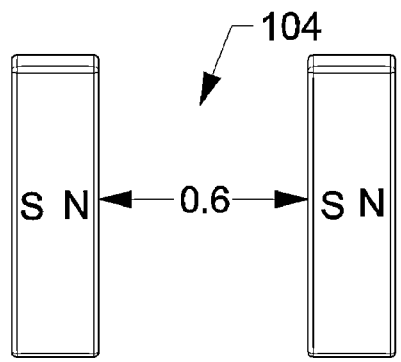
FIG. 57 shows the distance between two magnets in accordance with one embodiment of the present invention.
Figure 58:
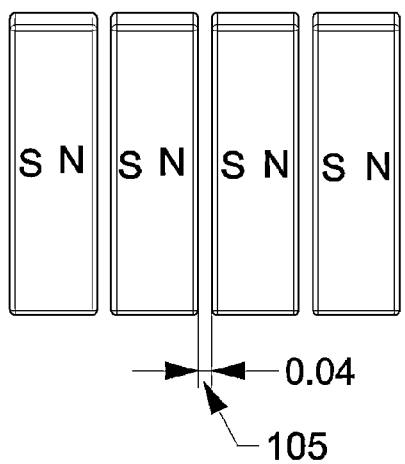
FIG. 58 shows a distance between two magnets and how additional magnets are associated near the original magnets as shown in FIG. 56 in accordance with one embodiment of the present invention.
Figure 59:
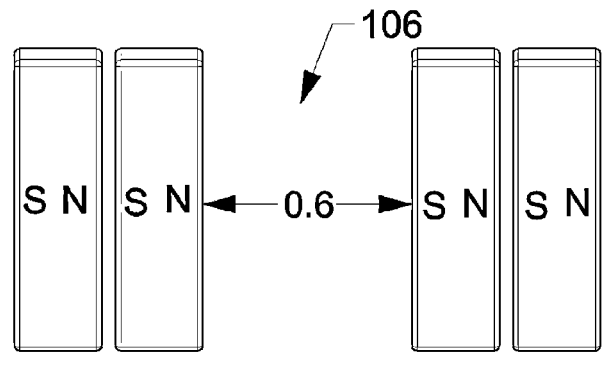
FIG. 59 shows a distance where doubled magnets are spread apart and how the magnetic force is changed but amplified by using two magnets near one another in accordance with one embodiment of the present invention.

One embodiment of the permanent magnet 100 is shown in FIG. 54, and discloses a pie shape wedge which optimizes the area/volume for one embodiment of this generator. The magnetic orientation in this embodiment is from the front of the wedge 102 (FIG. 55) as magnetic north to the back of the wedge 101 (FIG. 55) as magnetic south. FIG. 56 shows a distance and how magnetism is affected by the distance between two magnets. As shown, the magnetism is reduced by a factor of $1/d^3$ as the distance (d) is increased. As can be seen from the table above, and FIGS. 56-61, more than two opposite magnets can be used in any magnet pocket in any individual rotor. For simplicity, most of the embodiments discussed below just use two opposite magnets.

Figure 60:
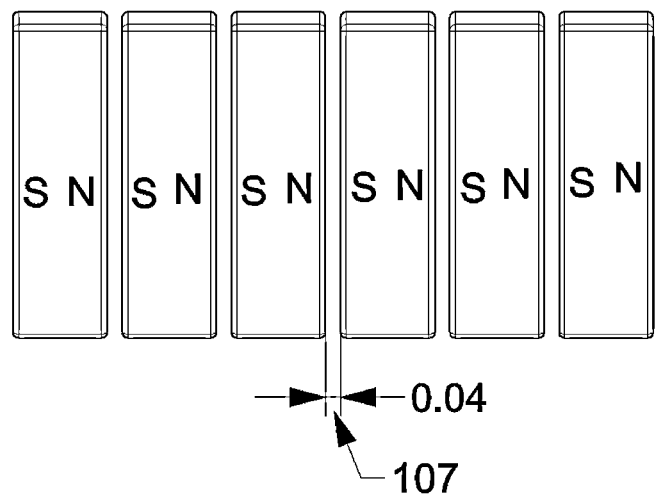
FIG. 60 shows the distance between two magnets and how additional magnets are associated near the original magnets as shown in FIG. 56 in accordance with one embodiment of the present invention.
Figure 61:
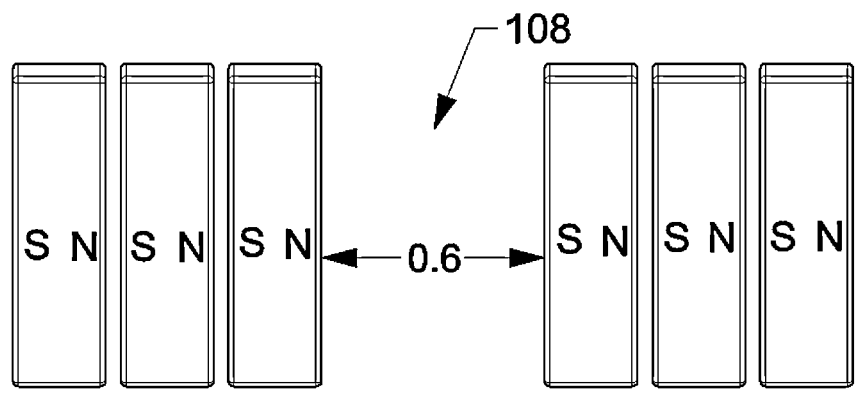
FIG. 61 shows a distance where tripled magnets are spread apart and how the magnetic force is changed but amplified by using three magnets near one another in accordance with one embodiment of the present invention.
Figure 62:
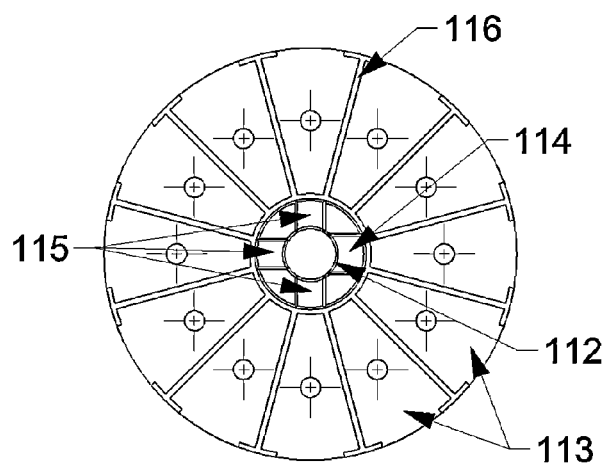
FIG. 62 shows an alternative embodiment of the initial rotor without magnets for the generator in accordance with one embodiment of the present invention where the magnet pockets are pie shaped and the keyway has been removed.
Figure 63:
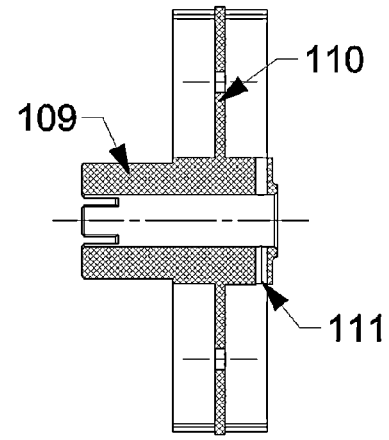
FIG. 63 shows a cross section of FIG. 62, showing a double set of opposite magnet pockets and keyway removed in accordance with one embodiment of the present invention.

One embodiment of the front (or initial) generator rotor 109 is shown in FIGS. 62 and 63, and in this embodiment, discloses a shear pin hole 111, opposite magnet separator 110, a center hole for the drive shaft 112, magnet pockets 113 for magnets 100 (see FIG. 54) front and back, orientation tang 114 to link and orient subsequent internal generator rotors, standard tangs 115, and neighboring magnet separator 116. The thickness of the opposite magnet separator 110 is preferably thin, and its thickness will impact the overall energy produced as discussed in Table 1 above. It will be understood by those of skill in the art that the tangs function essentially the same as the keys and slots discussed in the earlier embodiments. The opposite magnet separator 110 is preferably the minimum material thickness allowed for the material to maintain its structural integrity in use, and maintains maximum magnetic attraction between the two magnets while keeping the magnets firm in the pockets 113. The number of magnets 100 shown in FIGS. 62 and 63 can be varied. In such cases, the angle of the pie shaped magnets shown in FIG. 54 can be greater or smaller depending on the number of magnets used. In the embodiment shown in FIGS. 62 and 63, there are twelve (12) magnets on each face of the rotor (separated on one face from the other face by the opposite magnet separator 110), for a total of twenty-four (24) magnets. If additional power were desired, as discussed above, more than two opposite magnets at each magnet location could be used on each face of the rotor. For example, using the configuration of FIG. 58, there could be twenty-four (24) magnets on each face of the rotor (stacked two (2) deep in each magnet pocket, with still only twelve (12) magnets in radial arrangement in a single layer), for a total forty-eight magnets on the rotor. If the magnets were stacked three (3) deep in each magnet pocket, as shown in FIG. 60, each side of the rotor face could have thirty-six (36) magnets (stacked three (3) deep), for a total of seventy-two (72) magnets on the rotor. Magnets can be stacked four (4) or more deep in any particular magnet pocket.

When multiple magnets are stacked in a magnet pocket, they are preferably separated by a non-magnetic magnet spacer. In a preferred embodiment, the magnet spacer is less than 0.04 inch thick, and more preferably 0.025 inch or less in thickness. The smaller the gap between the stacked magnets the more magnetic amplification. In one embodiment, the magnetic spacer is made of plastic. In one embodiment, the depth of the magnet pocket is less than 1 inch. In one embodiment the magnet pockets are between ½ and ⅛ inches in depth, with one preferred embodiment having a magnet pocket that is approximately 0.25 inches deep. In an embodiment using stacked magnets in a single magnet pocket 0.25 inches deep, and using a magnet spacer, the magnets may be slightly less than ⅛ inch thick each, with the remaining depth accounted for by the magnet spacer. In one embodiment, the overall depth of the magnet pockets remains relatively small to ensure that the desired magnetic amplification on the stator is achieved. In other words, the deeper the magnet pocket, the farther away some of the magnets will be from the stator, and less amplification will be achieved.

Figure 64:
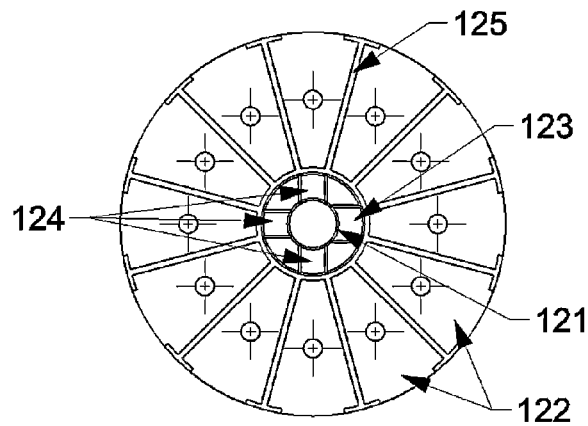
FIG. 64 shows an alternative embodiment of a main rotor used in the generator section without the magnets, where the magnet pockets are pie shaped and the keyway has been removed in accordance with one embodiment of the present invention.
Figure 65:
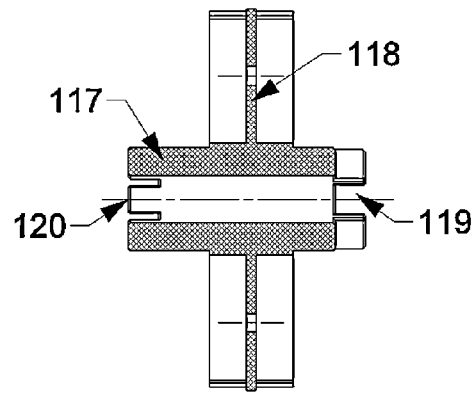
FIG. 65 shows a cross section of FIG. 64, showing a double set of opposite magnet pockets and keyway removed in accordance with one embodiment of the present invention.

One embodiment of the center generator rotor 117 (also referred to as the "main rotor") is shown in FIGS. 64 and 65, and in this embodiment, shows a opposite magnet separator 118 (similar to opposite magnet separator 110 in the front/initial rotor), slots 119 to link to into tangs of rotors 120 and 114 (see FIG. 63), a center hole for the drive shaft 121, pockets 122 for magnets 100 (FIG. 54) front and back, orientation tang 123 to link and orient subsequent generator rotors, standard tangs 124, and a neighboring magnet separator 125 for separation of magnets. Again, the opposite magnet separator 118 is preferably the minimum material thickness allowed for the material to maintain its structural integrity in use, and maintains maximum magnetic attraction between the two magnets while keeping the magnets firm in the pockets 122. There can be multiple center generator rotors 117. As with the front (or initial) rotor discussed above, the center rotor and back (or "end") rotor can also have varying numbers of magnets, including stacked layers as discussed above. In some embodiments, the rotors do not use a drive slot on the drive shaft.

Figure 66:
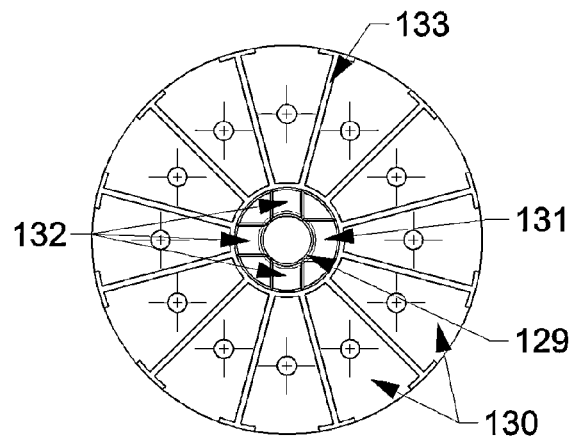
FIG. 66 shows an alternative embodiment of the last rotor without magnets for the generator, where the magnet pockets are pie shaped and the keyway has been removed in accordance with one embodiment of the present invention.
Figure 67:
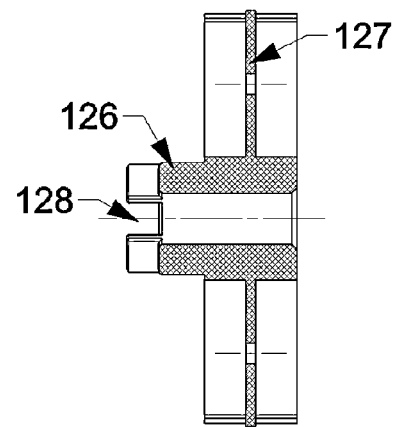
FIG. 67 shows a cross section of FIG. 66, showing a double set of opposite magnet pockets in accordance with one embodiment of the present invention.

One embodiment of the back generator rotor 126 (or "end rotor") is shown FIGS. 66 and 67, and in this embodiment, shows a opposite magnet separator 127, slots 128 to link into tangs of rotors 120 (FIG. 65), a center hole for the drive shaft 129, pockets 130 for magnets 100 (FIG. 54) front and back, orientation slot 131, slots 132 for standard tangs 124 (FIG. 65) and neighboring magnet separator 133 for separation of magnets on a face of the rotor. As with the similar structure for the initial rotor and center rotor, the neighboring magnet separator 133 is preferably the minimum material thickness allowed for the material to maintain its structural integrity in use, while keeping the magnets firm in the pockets 130.

Figure 68:
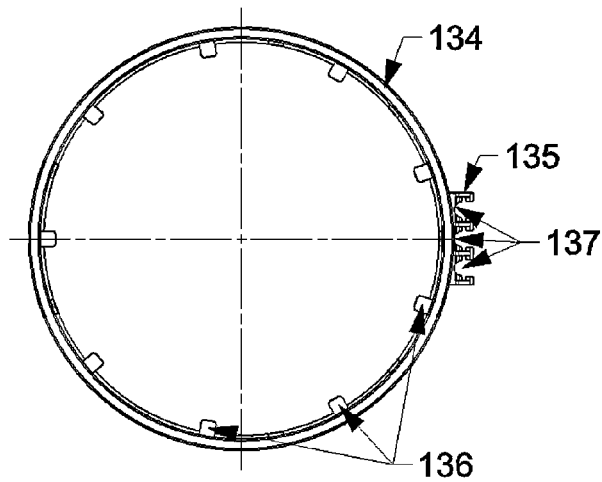
FIG. 68 shows an alternative embodiment of the stator, where the center mounting section of spools have been removed and slots for wiring and electrical springs have been added in accordance with one embodiment of the present invention.
Figure 69:
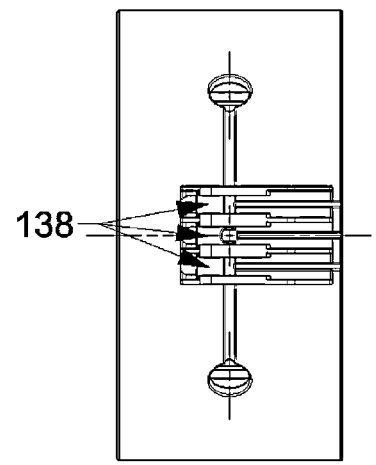
FIG. 69 shows a side view of FIG. 68 in accordance with one embodiment of the present invention.

One embodiment of the generator stator case 134 is shown in FIG. 68-69, and in this embodiment, shows alignment rails 135, spool alignment rails 136, hard wiring channels 137 and the modular slots 138 (FIG. 69) for electrical transmission springs.

Figures 70, 71, 72:
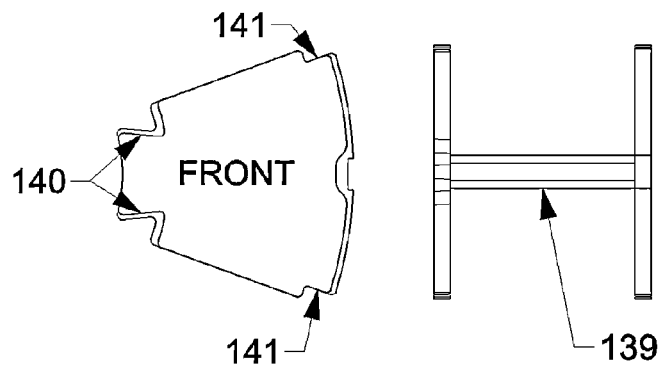
FIG. 70 shows an alternative embodiment of the spool which holds the magnetic wire, which increases the amount of magnetic wire used in accordance with one embodiment of the present invention.
FIG. 71 shows a side view of FIG. 70.
FIG. 72 shows a back end view of FIG. 70.

One embodiment of the generator spools 139 is shown in FIG. 70-72, and in this embodiment, discloses the front of the spool (FIG. 70) which has a smaller tang 140 and alignment rail slots 141, the back of the spool (FIG. 72) has a larger tang 142 to maintain proper orientation during assembly.

One embodiment of the generator spool mount 145 is shown in FIG. 73-75, and in this embodiment, discloses the back of the spool mount slot 143 (FIG. 73) to attach the larger tang 142 (FIG. 72), the clearance hole for the rotors 109, 117, 126 (FIGS. 63, 65 and 67) and the front spool mount slot 146 (FIG. 75) to attach the smaller tang 140 (FIG. 70).

One embodiment of the generator electrical spring 147 is shown in FIG. 76, and in this embodiment, provides for the transmission from the generator stator to the electrical rails without hard wiring the each stator.

One embodiment of the generator stator assembly 148 is shown in FIG. 77-78, and in this embodiment, integrates a spool mount 145, several spools 139, stator case 134 and three electrical springs 147.

One embodiment of the generator shaft 149 is shown in FIG. 79, and in this embodiment, has a flat 150 on one end to mount the turbine fan blades, a snap ring groove 151(*a*) and a shear pin hole 151.

Figure 80:
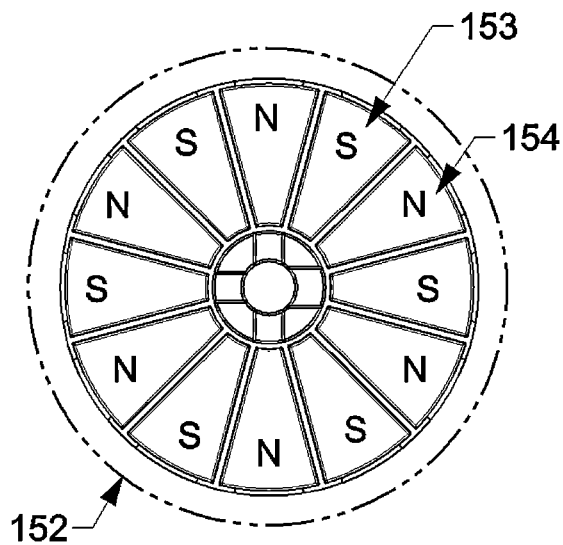
FIG. 80 shows an alternative assembly of the front end rotor where magnets are installed in series such that (NS)-(NS) is configured in accordance with one embodiment of the present invention.
Figure 81:
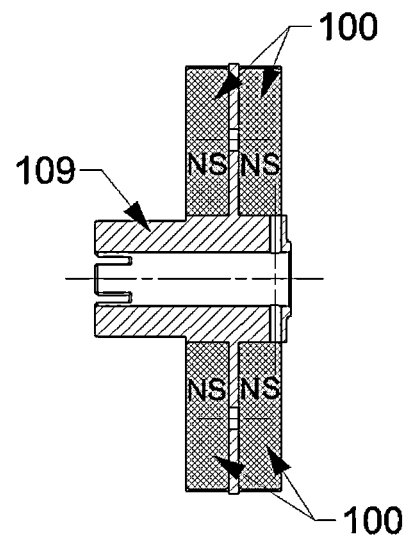
FIG. 81 shows a cross section of FIG. 80.

One embodiment of the front rotor end assembly 152 is shown in FIGS. 80 and 81. In this embodiment, the assemblies contain the front rotor end 109 (FIG. 81) and multiple magnets 100 in two opposite positions. Magnets are alternated south pole 153 and north pole 154 radially around the assembly. Opposite magnets 100 (FIG. 81) are installed front to back with the same magnetic orientation. Magnets 100 (FIG. 82) are separated by opposite magnet separator 155 (minimum material thickness) to maximize the magnetic attraction but separate the two magnets. The minimum material keeps the magnets in the pockets on the spools and has a major effect causing magnetic amplification.

Figure 82:
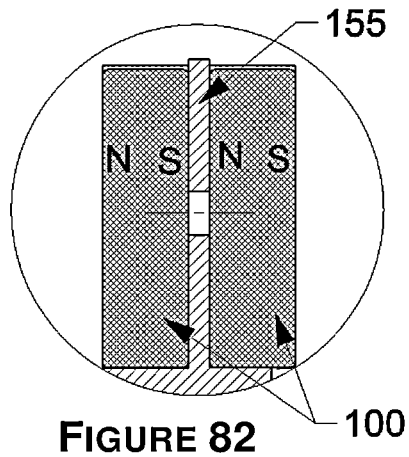
FIG. 82 shows an exploded view of a portion of FIG. 81 showing the back-to-back configuration of magnets in accordance with one embodiment of the present invention.
Figure 83:
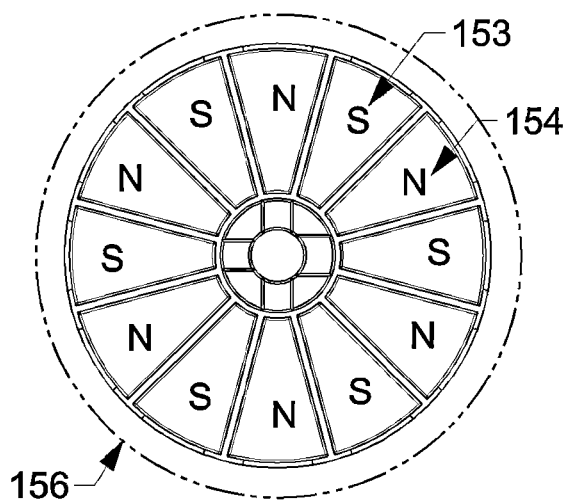
FIG. 83 shows an alternative assembly of a main rotor in accordance with one embodiment of the present invention.

One embodiment of the center rotor assembly 156 is shown in FIGS. 82 and 83. In this embodiment, the assemblies contain the inner rotor 117 (FIG. 84) and multiple magnets 100 in two positions. Magnets are alternated south pole 153 and north pole 154 radially around the assembly. Opposite magnets 100 (FIG. 84) are installed front to back with the same magnetic orientation. The magnets 100 are separated by a thin layer of material.

Figure 84:
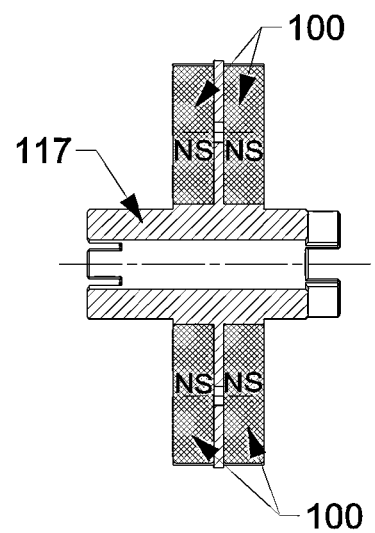
FIG. 84 shows a cross-section of FIG. 83 in accordance with one embodiment of the present invention.
Figure 85:
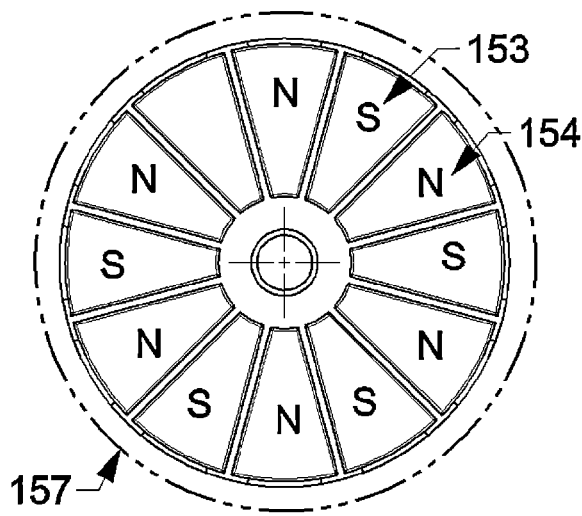
FIG. 85 shows an alternative assembly of the back end rotor where magnets are installed alternating magnetic orientation and in a radial arrangement in accordance with one embodiment of the present invention.
Figure 86:
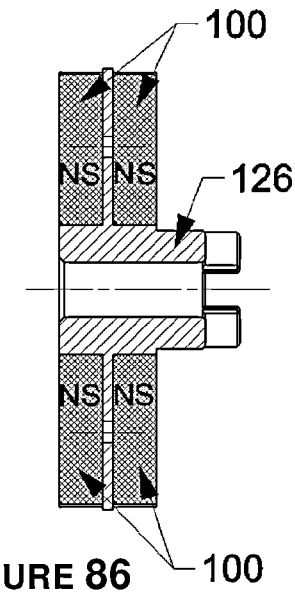
FIG. 86 shows a cross section of FIG. 85 where magnets are installed in series such that (NS)-(NS) is configured in accordance with one embodiment of the present invention.

One embodiment of the back rotor end assembly 157 is shown in FIGS. 84 and 85. In this embodiment, the assemblies contain the back rotor end 126 (FIG. 86) and multiple magnets 100 in two positions. Magnets are alternated south pole 153 and north pole 154 radially around the assembly. Opposite magnets 100 (FIG. 86) are installed front to back with the same magnetic orientation. The magnets are separated by a thin layer of material.

Figure 87:
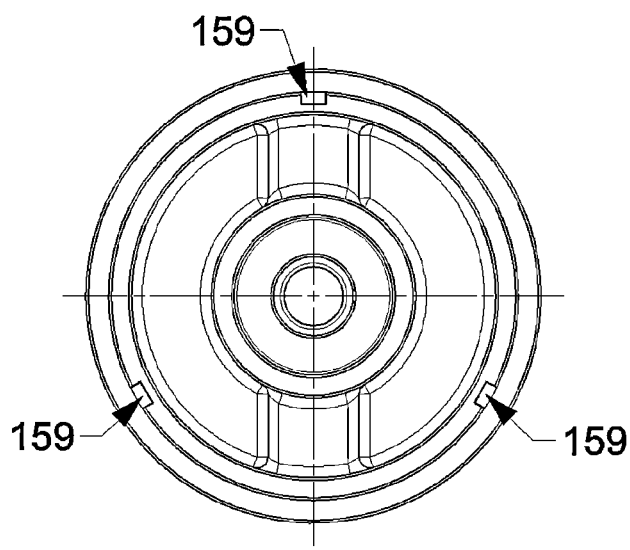
FIG. 87 shows an alternative embodiment of the fan end cap holding the bearings, seal and drive shaft in accordance with one embodiment of the present invention.
Figure 88:
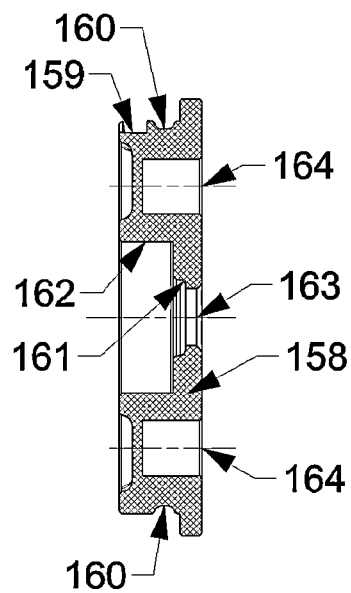
FIG. 88 is a side view of FIG. 87 in accordance with one embodiment of the present invention.

One embodiment of the front seal cap 158 is shown in FIG. 87-88, and in this embodiment, contains three (3) grooves 159 to attach the seal cap to the turbine housing, outer seal groove 160, inner shaft seal groove 161, non-magnetic bearing hole 162, shaft clearance hole 163 and two holes 164 for spanner wrench.

Figure 89:
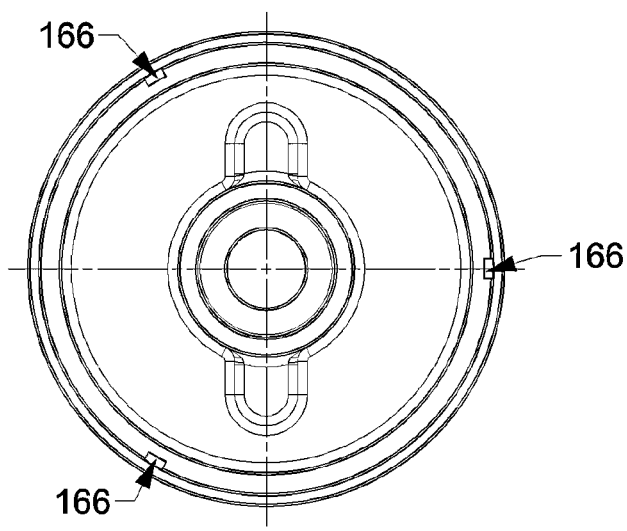
FIG. 89 shows a back view of alternative embodiment of the fan end cap in accordance with one embodiment of the present invention.
Figure 90:
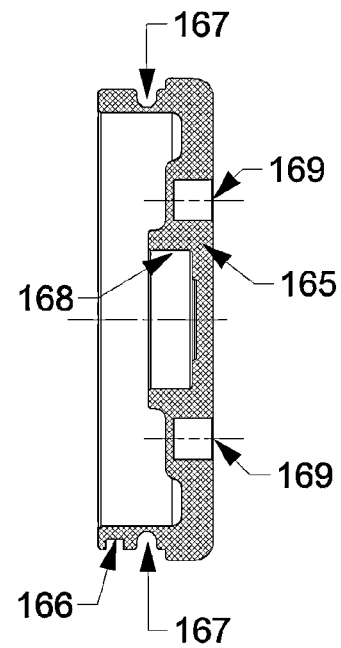
FIG. 90 shows a cross section view of FIG. 87 in accordance with one embodiment of the present invention.

One embodiment of the back seal cap 165 is shown in FIG. 89-90, and in this embodiment, contains three (3) grooves 166 to attach the seal cap to the turbine housing, outer seal groove 167, non-magnetic bearing hole 168 and two holes 169 for spanner wrench.

Figure 91:
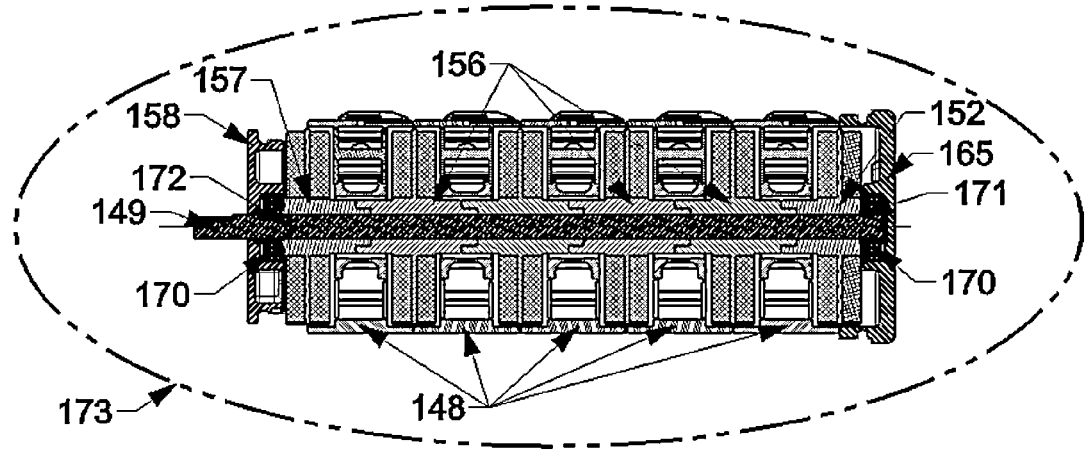
FIG. 91 shows a cross-sectional view of an alternative embodiment of the assembly of the generator in accordance with one embodiment of the present invention.
Figure 92:
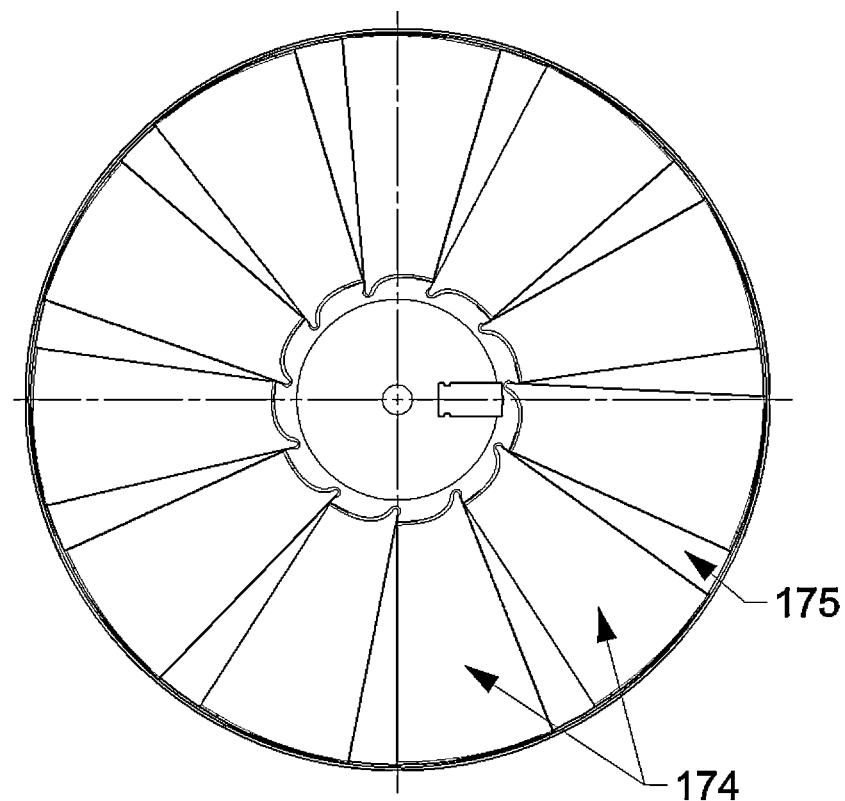
FIG. 92 shows an alternative embodiment of a multi blade wind turbine fan in accordance with one embodiment of the present invention.

One embodiment of the generator core 173 is shown in FIG. 91, and in this embodiment, contains the front seal cap 158, back seal cap 165, two non-magnetic bearings 170, shear pin 172, drive shaft 149, snap ring 171, two or more stators 148, front rotor end 152, two or more center rotors 156, and back rotor end 157.

Figure 93:
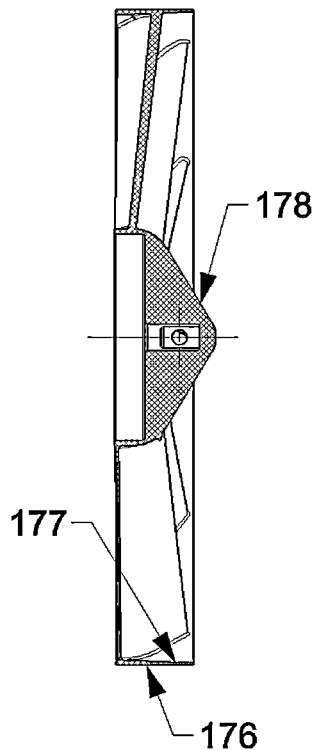
FIG. 93 shows a cross section of FIG. 92 in accordance with one embodiment of the present invention.
Figure 94:
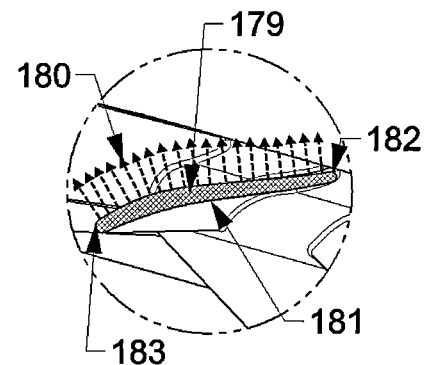
FIG. 94 shows a cross-sectional view of a single wind turbine blade airfoil design in FIG. 92 in accordance with one embodiment of the present invention.
Figure 95:
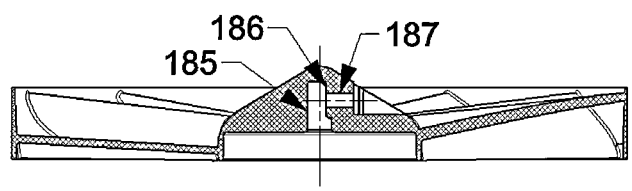
FIG. 95 shows a cross-section of FIG. 92 in accordance with one embodiment of the present invention.
Figure 96:
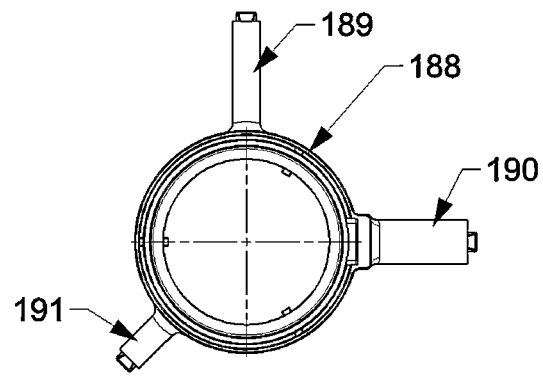
FIG. 96 shows an end view of an alternative embodiment of the modular wind turbine generator and fan case in accordance with one embodiment of the present invention.

One embodiment of the turbine blades 174 is shown in FIG. 92-95, and in this embodiment, each blade is attached to an outer stabilizer ring 176 (FIG. 93) where each blade has an gap 175 (FIG. 92) less than $\frac{1}{5}^{th}$ of the area of an individual blade between subsequent turbine blades. Other sizes can be used. Each blade is attach to a center hub 178 (FIG. 93). The stabilizer ring is preferably tapered 177 (FIG. 93) to compress the air flow and secure the air flow to the tip of the turbine blade. Each turbine blade 174 (FIG. 94) has a concave surface 181 (FIG. 94), a leading edge 183 (FIG. 94), a thin training edge 182 (FIG. 94) and a convex surface 180 (FIG. 94) that is on the opposite side of the directed air flow causing aerodynamic lift 180 to the turbine blade. The turbine blade can contain a hole 185 (FIG. 95) to attach to the generator drive shaft, an internal flat 186 (FIG. 95) to orient to the generator drive shaft and a set screw 187 to secure the turbine blade to the drive shaft.

Figure 97:
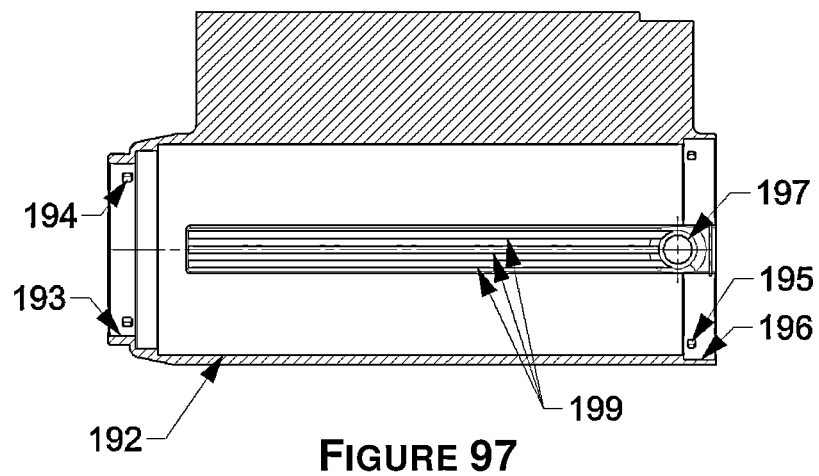
FIG. 97 shows a cross-section of FIG. 96 in accordance with one embodiment of the present invention.
Figure 98:
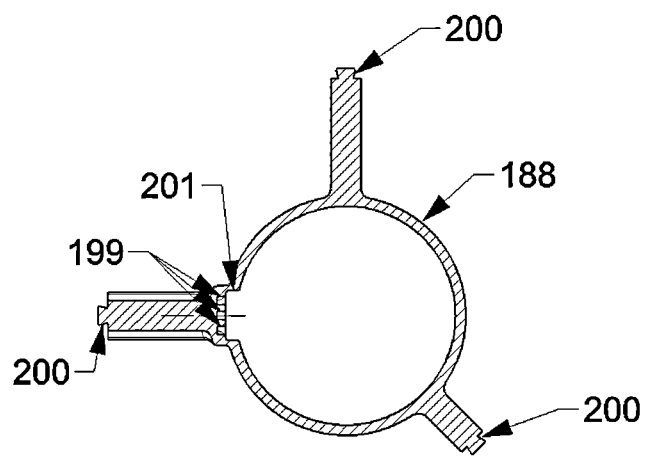
FIG. 98 shows a cross-section of FIG. 97 showing the electric rails and the mounting lugs in accordance with one embodiment of the present invention.
Figure 99:
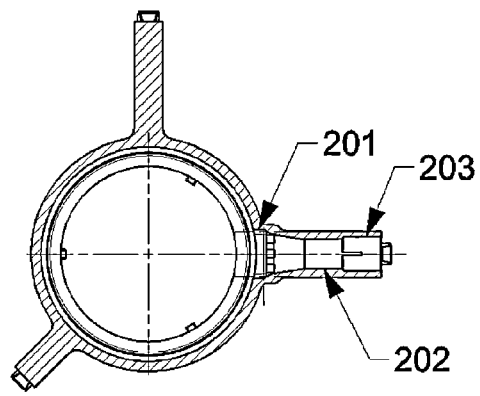
FIG. 99 shows a cross-section of FIG. 97 showing the key slot for the stators and the wiring channel in accordance with one embodiment of the present invention.

One embodiment of the wind turbine case 188 is shown in FIG. 96-99, and in this embodiment, has three mounting lugs, the electrical conduit lug 190 allows the electrical power to be relayed out of the generator, longest lug 189 maintains proper orientation during assembly, smallest lug 191 also for orientation. A cross-section through the longest lug 189 is shown in FIG. 97, and depicts the generator core mounting surface 192, the front seal cap mounting surface 193, locking lugs for the front seal cap 194, lock lugs for the back seal cap 195, the back seal cap mounting surface 196, the hole for electrical transmission wiring 197 and the electrical transmission rails 199. A cross-section through the front section of the wind turbine case 188 is shown in FIG. 98 and shows the mounting slots 200, the electrical transmission rails 199 and the orientation slot for the generator stators 201. A cross-section through the electrical power slot 202 is shown in FIG. 99, and shows the orientation slot for the generator stators 201 and the electrical connector mounting surface 203.

Figure 100:
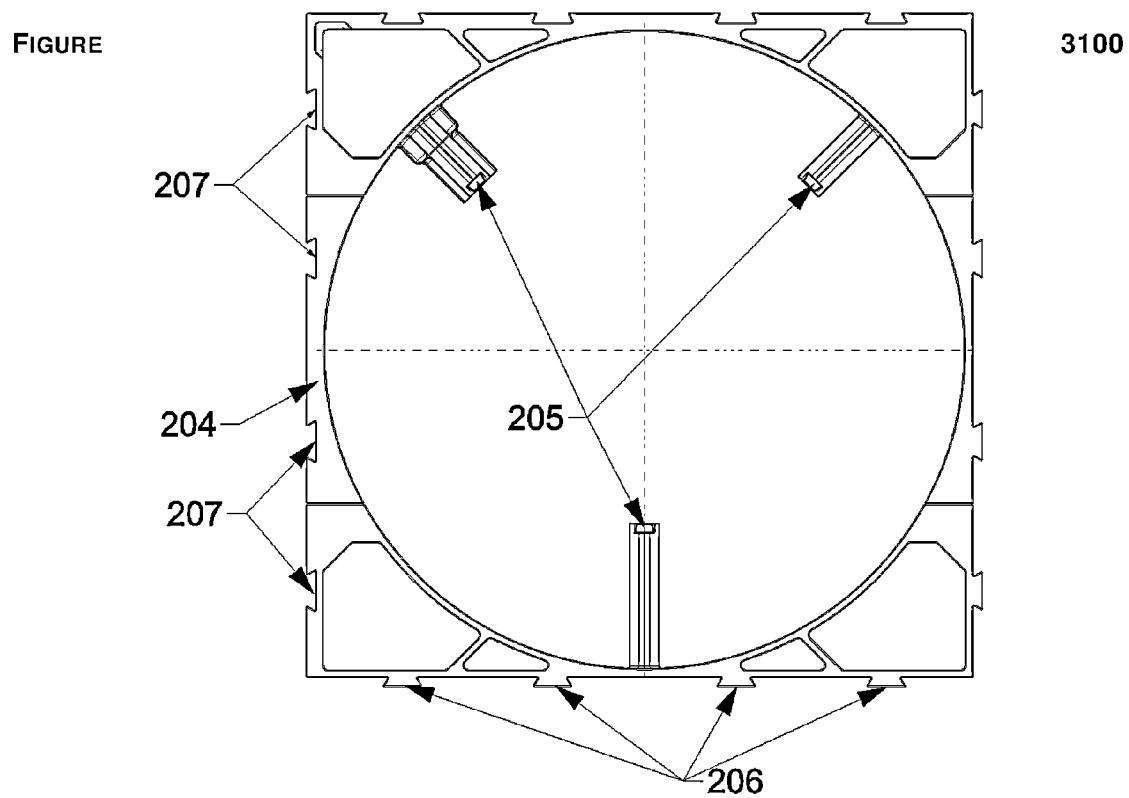
FIG. 100 shows an alternative embodiment of a square modular case in accordance with one embodiment of the present invention.

One embodiment of the square wind turbine case 204 is depicted in FIG. 100, and in this embodiment, discloses three lugs 205 that correspond to the wind turbine case 188 (FIG. 98), two or more mounting tangs 206 on two or more sides and two or more mounting slots 207 on two or more sides. As previously discussed, this allows multiple turbine cases to be connected.

Figure 101:
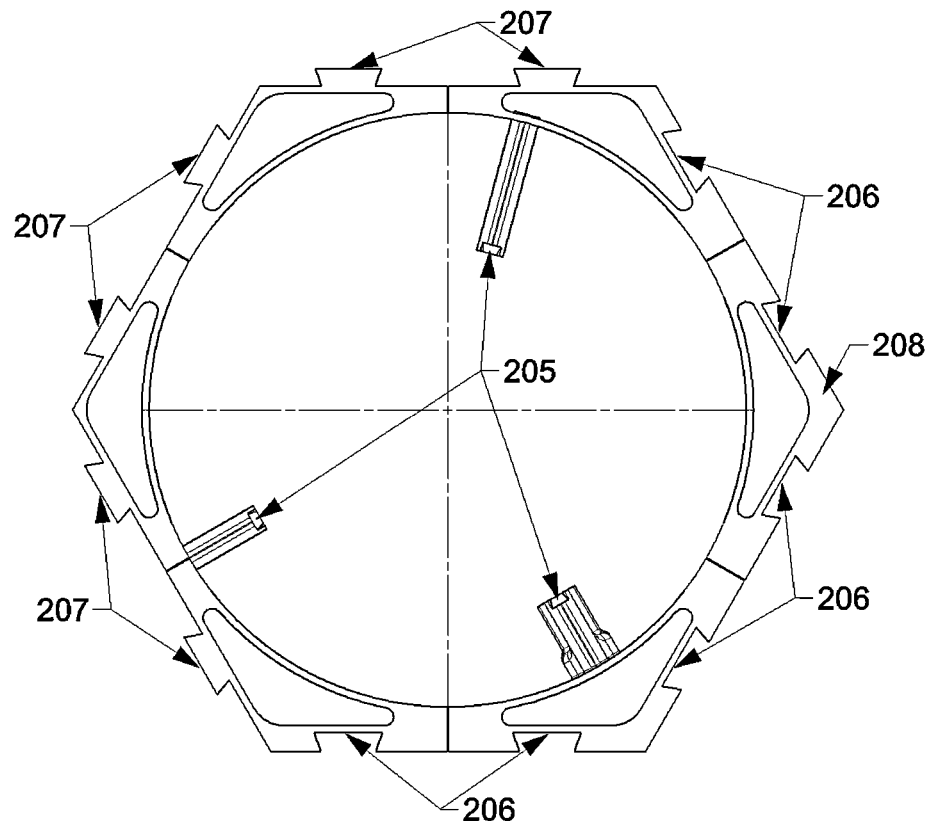
FIG. 101 shows an alternative embodiment of a hexagonal modular case in accordance with one embodiment of the present invention.

One embodiment of the hexagon wind turbine case 208 is depicted in FIG. 101, and in this embodiment, discloses three lugs 205 that correspond to the wind turbine case 188 (FIG. 98), two or more mounting tangs 206 on two or more sides and two or more mounting slots 207 on two or more sides.

Figure 102:
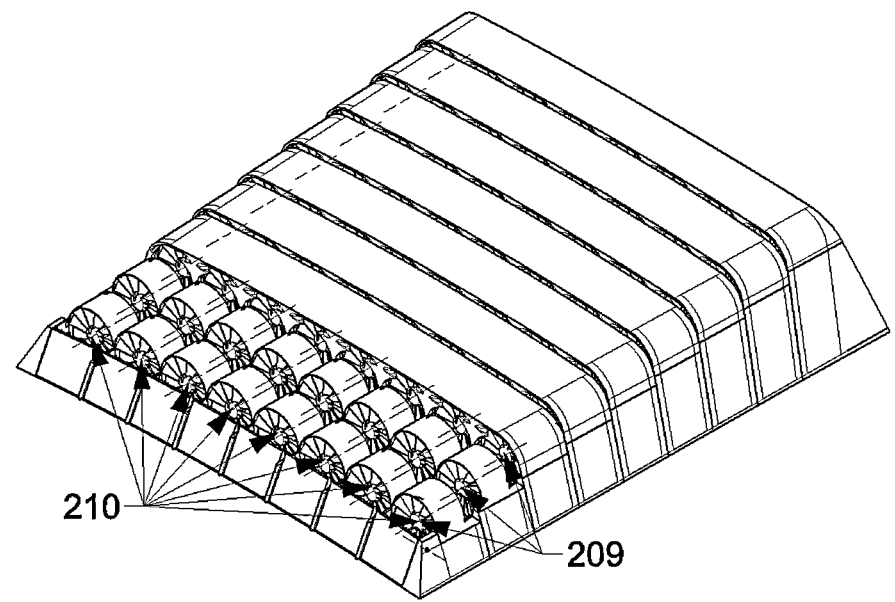
FIG. 102 shows a configuration of generators one behind the other, and side-by-side, which is preferred for vehicles, in accordance with one embodiment of the present invention.

One embodiment of the wind turbine configuration is shown in FIG. 102, and in this embodiment, multiple wind turbine cases are aligned behind one another 209 and also side by side 210 to be applied to automobiles, trucks, vans, semi-trailers, trains, recreational vehicles, other transportation vehicles, buildings, or other structures.

One embodiment of the wind turbine spool coil 139 is shown in FIG. 103, and in this embodiment, discloses magnetic wire 211 wound around each of the spools within the generator where wire 211 is wound uniformly 212 (FIG. 104) to maximize the length of wire in order to maximize the generator output voltage.

One embodiment of the wind turbine stator and rotor configuration is shown in FIG. 105 where magnet sets (215-220) are shown surrounding wind turbine stator coils (221-225), spools shown and wire not depicted, causes increased magnetic flux fields through each of the spools in a way that amplifies the overall magnetic flux field and strengthens the generated voltage and current in each of the coils.

One embodiment is to utilize thinner magnets (226-229) within each magnetic pocket shown in FIG. 106. Magnets (226-227) are configured on one side of the rotor and magnets (228-229) are on the opposite side of the rotor.

One embodiment is to utilize thinner magnets (226-227) shown in FIG. 107 separated by a non-magnetic material spacer 230.

Figure 108:
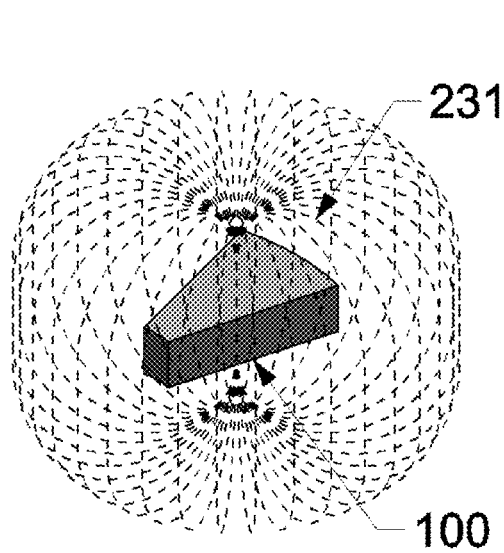
FIG. 108 shows the magnetic flux field around the magnet.

FIG. 108 shows the magnetic field flux 231 emanating in a spherical pattern around a magnet 100.

Figure 109:
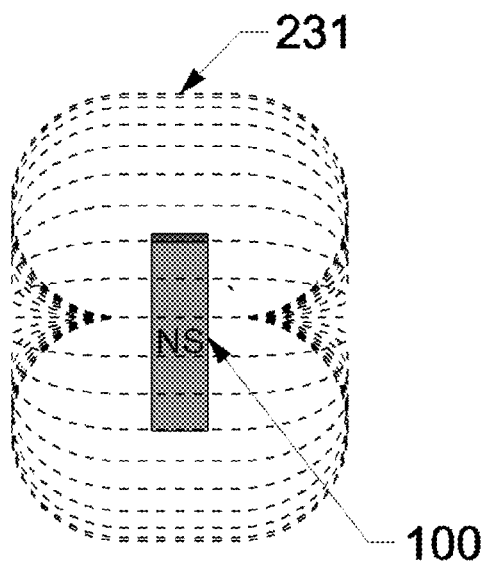
FIG. 109 shows the cross-section of the magnet and the surrounding magnetic flux field around the N (north) and S (south) poles.

FIG. 109 shows the magnet 100 in a cross-section view where the magnetic flux field 231 emanates from the N (north side) of the magnet 100 around in a spherical pattern to the S (south side) of the magnet.

Figure 110:
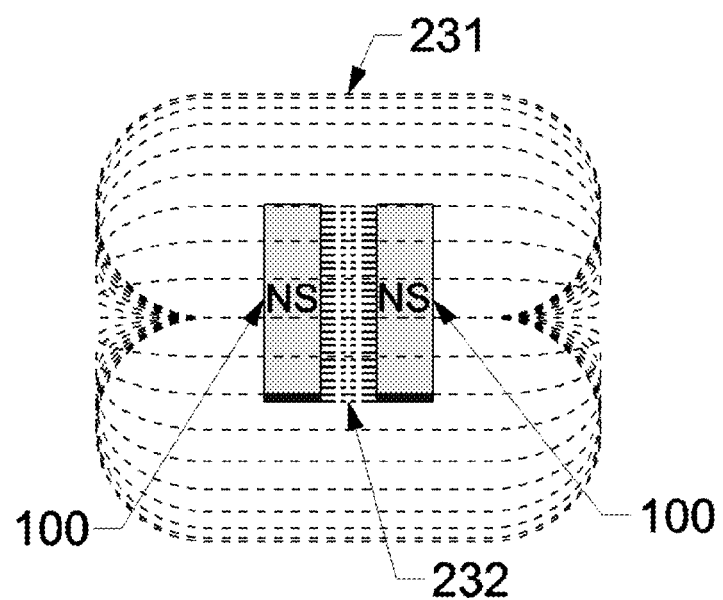
FIG. 110 shows the reaction between two magnets as each magnet approaches the other magnet where the field strength increases as the magnets become in contact to one another.

FIG. 110 shows two magnets 100 where the space between the magnets has a magnetic flux field 232 such that as the two magnets approach one another the magnetic flux field 232 increases in strength. Based upon the laws of conservation of energy, the magnetic flux field 231 strength must increase proportionately to flux field 232 strength documented in Table 1.

While the invention has been described with respect to a limited number of embodiments, those skilled in the art, having benefit of this disclosure, will appreciate that other embodiments including the use within an electronic motor can be devised which do not depart from the scope of the invention as disclosed here. Accordingly, the scope of the invention should be limited only by the attached claims.

What is claimed is:

1. An electric generator comprising:
   a. a drive shaft; and
   b. a series of alternating stators and rotors configured along said drive shaft, said series of rotors comprising an initial rotor, a first main rotor, and a second main rotor, and said series of stators comprising a first stator between said initial rotor and first main rotor, and a second stator between said first main rotor and second main rotor, and wherein said first and second main rotors comprise a plurality of axially aligned opposite magnet pockets on each side of the first and second main rotors, each of the opposite magnet pockets containing at least one axially aligned magnet, and wherein the at least one axially aligned magnet in each of the magnet pockets are oriented such that opposing magnetic poles face each other, wherein the two axially aligned magnets of the first main rotor and the two axially aligned magnets of the second main rotor create a magnetic flux in the second stator when rotated about the drive shaft.

2. The electric generator of claim 1, wherein each magnet pocket contains two or more magnets separated by a non-magnetic magnet spacer.

3. The electric generator of claim 2, wherein the non-magnetic spacer is less than 0.10 inches thick.

4. The electric generator of claim 1, wherein the magnets are pie-shaped and radially arranged around each side of the rotor.

5. The electric generator of claim 1, wherein the magnet pockets are between ½ and ⅛ inches in depth.

6. The electric generator of claim 1 wherein the axially aligned magnets are separated by an opposite magnet separator that is non-magnetic and less than 0.10 inches thick.

7. An improved magnetic rotator assembly, comprising:
   a. a circular rotor having a plurality of magnet pockets radially arranged on each face of the circular rotor and a central drive shaft bore;
   b. a drive shaft extending through the central drive shaft bore; and
   c. a plurality of magnets, wherein magnets are seated in said magnet pockets on each face of the circular rotor in a first layer on each face so that the polarity of each magnet is opposite the polarity of the opposite magnet at both ends of the magnet.

8. The assembly of claim 7, further comprising:
   a. a second layer of magnets seated in each magnet pocket on each face, where the second layer is located directly below the first layer and so that the polarity of each magnet in the first layer is opposite the polarity of each magnet in the second layer at both ends of the magnet; and
   b. a non-magnetic magnet spacer between said first layer of magnets and second layer of magnets.

9. The assembly of claim 7, wherein the magnets are pie-shaped.

10. The assembly of claim 7, where two or more circular rotors are used in series, and the gap between the rotors is 1.0 inches or less.

11. The assembly of claim 8, where the thickness of the non-magnetic magnet spacer is 0.1 inches or less.

12. The assembly of claim 7, where the magnets have a magnetism value of 6112-10068 gauss.

13. The assembly of claim 7, where the circular rotor has at least four (4) magnet pockets on each face of the circular rotor.

14. An improved magnetic generator core, comprising:
   a. a central housing with a hollow interior;
   b. a drive shaft extending through the interior of the central housing;
   c. multiple magnetic rotor assemblies located within the housing around the drive shaft, where each rotor assembly comprises, a circular rotor having a first face and a second face, said first and second circular rotor faces each having a plurality of radially arranged magnets forming a first layer and a second layer of magnets on each face, so that the polarity of each magnet is opposite the polarity of the opposite magnet at both ends of the magnet; and
   d. at least one stator disposed between the rotor assemblies.

15. The generator core of claim 14, wherein the first and second layers of magnets on each rotor face are separated by a non-magnetic spacer.

16. The generator core of claim 14, wherein the rotor assemblies further comprise magnet pockets in which the magnets are seated.

17. The generator core of claim 14, wherein the magnets are pie shaped.

18. The generator core of claim 14, wherein the total depth of the combined first and second layers of magnets on said first face and second face are each between ½ and ⅛ inch in depth.

19. The generator core of claim 14 wherein the magnets on said first and second rotor faces are separated by an opposite magnet separator that is non-magnetic and less than 0.06 inches thick.

20. The generator core of claim 15 wherein non-magnetic magnet spacer is less than 0.1 inches thick.

* * * * *